United States Patent
Zhang et al.

(10) Patent No.: US 11,647,189 B2
(45) Date of Patent: *May 9, 2023

(54) CROSS-COMPONENT CODING ORDER DERIVATION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,486

(22) Filed: Jun. 14, 2021

(65) Prior Publication Data

US 2021/0306631 A1 Sep. 30, 2021

Related U.S. Application Data

(63) Continuation of application No. 17/090,199, filed on Nov. 5, 2020, now Pat. No. 11,070,805, which is a
(Continued)

(30) Foreign Application Priority Data

Jul. 15, 2018 (WO) ............... PCT/CN2018/095720

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/103* (2014.11); *H04N 19/159* (2014.11);
(Continued)

(58) Field of Classification Search
CPC .... H04N 19/119; H04N 19/159; H04N 19/96; H04N 19/176
(Continued)

(56) References Cited

U.S. PATENT DOCUMENTS 10,200,700 B2 2/2019 Zhang et al.
10,419,757 B2 9/2019 Chen et al.
(Continued)

FOREIGN PATENT DOCUMENTS

CN 102577388 A 7/2012
CN 103369315 A 10/2013
(Continued)

OTHER PUBLICATIONS

Chen et al. "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting, Geneva, CH, Jan. 12-20, 2017, JVET-E1001, 2017.
(Continued)

*Primary Examiner* — Matthew K Kwan
(74) *Attorney, Agent, or Firm* — Perkins Coie LLP

(57) ABSTRACT

Method and apparatus for using block size restrictions in video decoding are described. In a representative aspect, a method for video decoding includes receiving a bitstream representation of video data including a block wherein the block comprises samples associated with a first component and second components, wherein samples associated with the first component of the block have a dimension M×N; and decoding the first component and the second components of the block; wherein decoding the first component of the block
(Continued)

comprises, based on the dimension, decoding a plurality of sub-blocks for the first component of the block, and the plurality of the sub-blocks are generated by performing a splitting operation only on the samples associated with the first component of the block and not on the samples associated with the second components of the block.

20 Claims, 19 Drawing Sheets

Related U.S. Application Data continuation of application No. PCT/IB2019/056005, filed on Jul. 15, 2019.

(51) Int. Cl.
*H04N 19/176* (2014.01)
*H04N 19/96* (2014.01)
*H04N 19/103* (2014.01)
*H04N 19/186* (2014.01)
*H04N 19/593* (2014.01)

(52) U.S. Cl.
CPC ......... *H04N 19/176* (2014.11); *H04N 19/186* (2014.11); *H04N 19/593* (2014.11); *H04N 19/96* (2014.11)

(58) Field of Classification Search
USPC ..................................................... 375/240.02
See application file for complete search history.

(56) References Cited

U.S. PATENT DOCUMENTS

| | | | |
|---|---|---|---|
| 10,469,847 B2 | 11/2019 | Xiu et al. | |
| 10,939,128 B2 | 3/2021 | Zhang et al. | |
| 10,979,717 B2 | 4/2021 | Zhang et al. | |
| 11,070,805 B2 | 7/2021 | Zhang et al. | |
| 11,228,762 B2 | 1/2022 | Zhang et al. | |
| 2011/0243236 A1* | 10/2011 | Haskell ................ | H04N 19/159 375/E7.104 |
| 2011/0255591 A1 | 10/2011 | Kim et al. | |
| 2012/0219216 A1 | 8/2012 | Sato | |
| 2013/0251028 A1 | 9/2013 | Au et al. | |
| 2014/0105291 A1 | 4/2014 | Nakamura et al. | |
| 2014/0294078 A1 | 10/2014 | Seregin et al. | |
| 2015/0117534 A1 | 4/2015 | Kim et al. | |
| 2015/0312588 A1 | 10/2015 | Yamamoto et al. | |
| 2016/0227245 A1 | 8/2016 | Liu et al. | |
| 2017/0078685 A1 | 3/2017 | Sato | |
| 2017/0244975 A1 | 8/2017 | Huang et al. | |
| 2017/0272748 A1 | 9/2017 | Seregin et al. | |
| 2017/0272759 A1 | 9/2017 | Seregin et al. | |
| 2017/0366818 A1 | 12/2017 | Zhang et al. | |
| 2018/0020241 A1 | 1/2018 | Li et al. | |
| 2019/0215512 A1 | 7/2019 | Lee et al. | |
| 2019/0215531 A1 | 7/2019 | Lee et al. | |
| 2020/0252619 A1 | 8/2020 | Zhang et al. | |
| 2020/0359051 A1 | 11/2020 | Zhang et al. | |
| 2020/0366896 A1 | 11/2020 | Zhang et al. | |
| 2020/0366910 A1 | 11/2020 | Zhang et al. | |
| 2020/0366933 A1 | 11/2020 | Zhang et al. | |
| 2020/0382769 A1 | 12/2020 | Zhang et al. | |
| 2020/0382800 A1 | 12/2020 | Zhang et al. | |
| 2021/0058618 A1 | 2/2021 | Zhang et al. | |
| 2021/0092395 A1 | 3/2021 | Zhang et al. | |
| 2021/0092396 A1 | 3/2021 | Zhang et al. | |
| 2021/0136411 A1 | 5/2021 | Zhang et al. | |

FOREIGN PATENT DOCUMENTS

| | | |
|---|---|---|
| CN | 104205837 A | 12/2014 |
| CN | 104780365 A | 7/2015 |
| CN | 107079160 A | 8/2017 |
| CN | 107534780 A | 1/2018 |
| TW | 201818719 A | 5/2018 |
| WO | 2015078304 A1 | 6/2015 |
| WO | 2018056763 A1 | 3/2018 |
| WO | 2018064948 A1 | 4/2018 |
| WO | 2018066849 A1 | 4/2018 |
| WO | 2019192491 A1 | 10/2019 |
| WO | 2019203940 A1 | 10/2019 |
| WO | 2019217189 A1 | 11/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.

Chen et al. "AHG5: Reducing VVC Worst-Case Memory Bandwidth by Restricting Bi-Directional 4×4 Inter Cus/Sub-Blocks," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0104, 2018.

Chen et al. "CE4-Related: Reducing Worst Case Memory Bandwidth in Inter Prediction," Joint Video Experts Team (JVET) of ITU-T SG 16 WP 3 and ISO/IEC JTC 1/SC 29/WG 11, 12th Meeting, Macao, CN, Oct. 3-12, 2018, JVET-L0371, 2018.

Choi et al. "CE1-Related: Minimum Block Size Restriction," Joint Video Experts Team (JVET) of ITU-T SG 16 WP 3 and ISO/IEC JTC 1/SC 29/WG 11, 12th Meeting, Macao, CN, Oct. 3-12, 2018, JVET-L0137, 2018.

Escoda et al. "Geometry-Adaptive Block Partitioning for Video Coding," IEEE International Conference on Acoustic, Speech, and Signal Processing,Honolulu, Hawaii, USA 2007.pp 657-660.

JEM-7.0: https://jvet.hhi.fraunhofer.de/svn/svn_HMJEMSoftware/tags/ HM-16.6-JEM-7.0.

Ikai et al. "Bi-Prediction Restriction in Small PU," Joint Collaborative Team on Video Coding (JCT-VC) of ITU-T SG16 WP3 and ISO/IEC JTC1/SC29/WG11, 7th Meeting, Geneva, CH, Nov. 21-30, 2011, document JCTVC-G307, 2011.

ITU-T H.265 "High efficiency video coding" Series H: Audiovisual and Multimedia Systems Infrastructure of audiovisual services—Coding of moving video,Telecommunication Standardization Sector of ITU, Available at address: https://www.itu.int/rec/T-REC-H.265 (Nov. 2019).

Li et al. "AHG5: Reduction of Worst Case Memory Bandwidth," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0122, 2018.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Sullivan et al. "Overview of the High Efficiency Video Coding (HEVC) Standard," IEEE Transactions on Circuits and Systems for Video Technology, Dec. 2012, 22(12):1649-1668.

Xu et al. "Non-CE8: Subblock Operation Removal for Chroma CPR," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0254, 2019.

Wiegand et al. "Overview of the H.264/AVC Video Coding Standard," IEEE Transactions on Circuits and Systems for Video Technology, Jul. 2003, 13(7):560-576.

Zhang et al. "CE4: Affine Prediction with 4×4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.

International Search Report and Written Opinion from PCT/IB2019/056005 dated Jan. 8, 2020, (18 pages).

International Search Report and Written Opinion from PCT/IB2019/056006 dated Mar. 4, 2020, (24 pages).

International Search Report and Written Opinion from PCT/IB2019/056015 dated Mar. 4, 2020, (27 pages).

(56) References Cited

OTHER PUBLICATIONS

International Search Report and Written Opinion from PCT/IB2019/056016 dated Jan. 8, 2020, (21 pages).
International Search Report and Written Opinion from PCT/IB2019/056023 dated Jan. 8, 2020, (21 pages).
Misra et al. "Description of SDR and HDR Video Coding Technology Proposal by Sharp and Foxconn," Joint Video ExplorationTeam (JVET) of ITU-T SG 16 WP 3 and ISO/IEC JTC 1/SC 29/WG 11, 10th Meeting: San Diego, US, Apr. 10-20, 2018, document JVET-J0026; 2018.
Misra et al. "Description of SDR and HDR Video Coding Technology Proposal by Sharp and Foxconn," Joint Video ExplorationTeam (JVET) of ITU-T SG 16 WP 3 and ISO/IEC JTC 1/SC 29/WG 11, 10th Meeting: San Diego, US, Apr. 10-20, 2018, document JVET-J0026r1; 2018.
Non-Final Office Action from U.S. Appl. No. 17/090,199 dated Dec. 23, 2020.
Non-Final Office Action from U.S. Appl. No. 17/150,146 dated Jul. 22, 2021.

\* cited by examiner

CROSS-COMPONENT CODING ORDER DERIVATION

CROSS-REFERENCE TO RELATED APPLICATION

This application is a continuation of U.S. patent application Ser. No. 17/090,199, filed on Nov. 5, 2020, which is a continuation of International Application No. PCT/IB2019/056005, filed on Jul. 15, 2019, which claims the priority to and benefits of International Patent Application No. PCT/CN2018/095720, filed on Jul. 15, 2018. All the aforementioned patent applications are hereby incorporated by reference in their entireties.

TECHNICAL FIELD

This patent document is directed generally to image and video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to using block size restrictions to perform video coding methods are described. For example, the presently disclosed technology discloses selecting a prediction mode or determining whether to split the block of video data (e.g., in a picture, slice, tile and the like) based on a property (or characteristic) of the luma or chroma components of the block of video data. The described methods may be applied to both the existing video coding standards (e.g., High Efficiency Video Coding (HEVC)) and future video coding standards or video codecs.

In one example aspect, a video processing method is disclosed. The method includes: receiving a bitstream representation of video data including a video block wherein the video block comprises samples in a first component and in a second component; deriving a first coding information for the first component from second coding information of sub-blocks for the second component in case that the video block for the second component is split into the sub-blocks; performing a conversion between the video block and the bitstream representation of the video block based on the first coding information.

In another example aspect, a method for video decoding is disclosed. The method comprises receiving a bitstream representation of video data including a video block wherein the video block comprises samples in a first component, the samples in the first component having a dimension of M×N; determining, based on one or more of specific conditions is satisfied, a first prediction mode for decoding the first component of the block is not a bi-prediction; and decoding the first component by using the first prediction mode In another example aspect, a method for video decoding is disclosed. The method comprises: receiving a bitstream representation of video data including a video block wherein the video block comprises samples in a first component and samples in a second component; determining a first prediction mode for decoding the first component of the block and determining a second prediction mode for decoding the second component of the block; decoding the first and second component by using the first and the second prediction mode respectively.

In another example aspect, a method for video decoding is disclosed. The method comprises receiving a bitstream representation of video data including a block wherein the block comprises samples associated with a first component and second components, wherein samples associated with the first component of the block have a dimension M×N; and decoding the first component and the second components of the block; wherein decoding the first component of the block comprises, based on the dimension, decoding a plurality of sub-blocks for the first component of the block, and the plurality of the sub-blocks are generated by performing a splitting operation only on the samples associated with the first component of the block and not on the samples associated with the second components of the block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION OF THE EMBODIMENTS

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Example Embodiments of Video Coding

Figure 1:
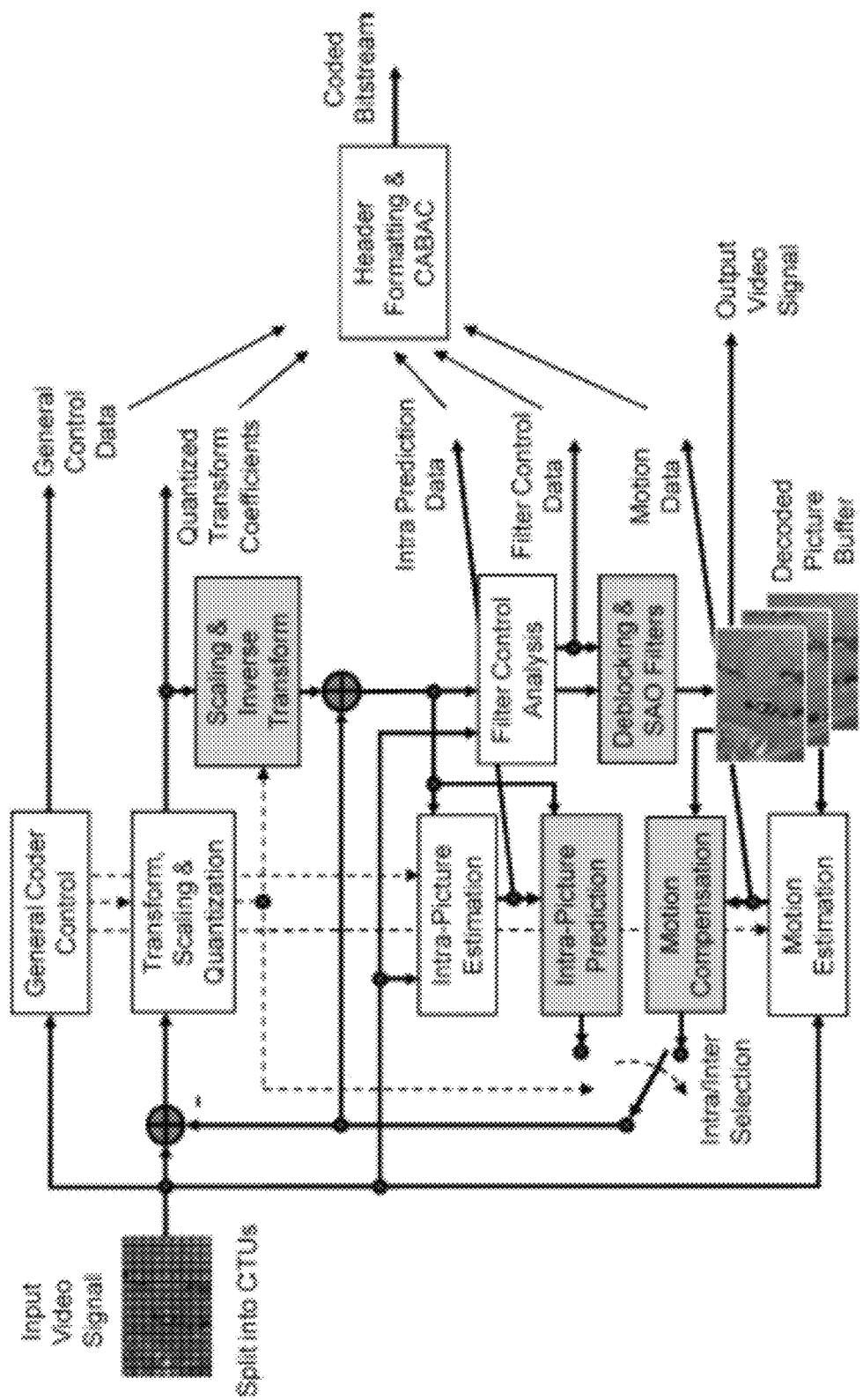
FIG. 1 shows an example block diagram of a typical High Efficiency Video Coding (HEVC) video encoder and decoder.

FIG. 1 shows an example block diagram of a typical HEVC video encoder and decoder (Reference [1]). An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 1) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (i.e., bitstream order) and the output order (i.e., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

1.1. Examples of Partition Tree Structures in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
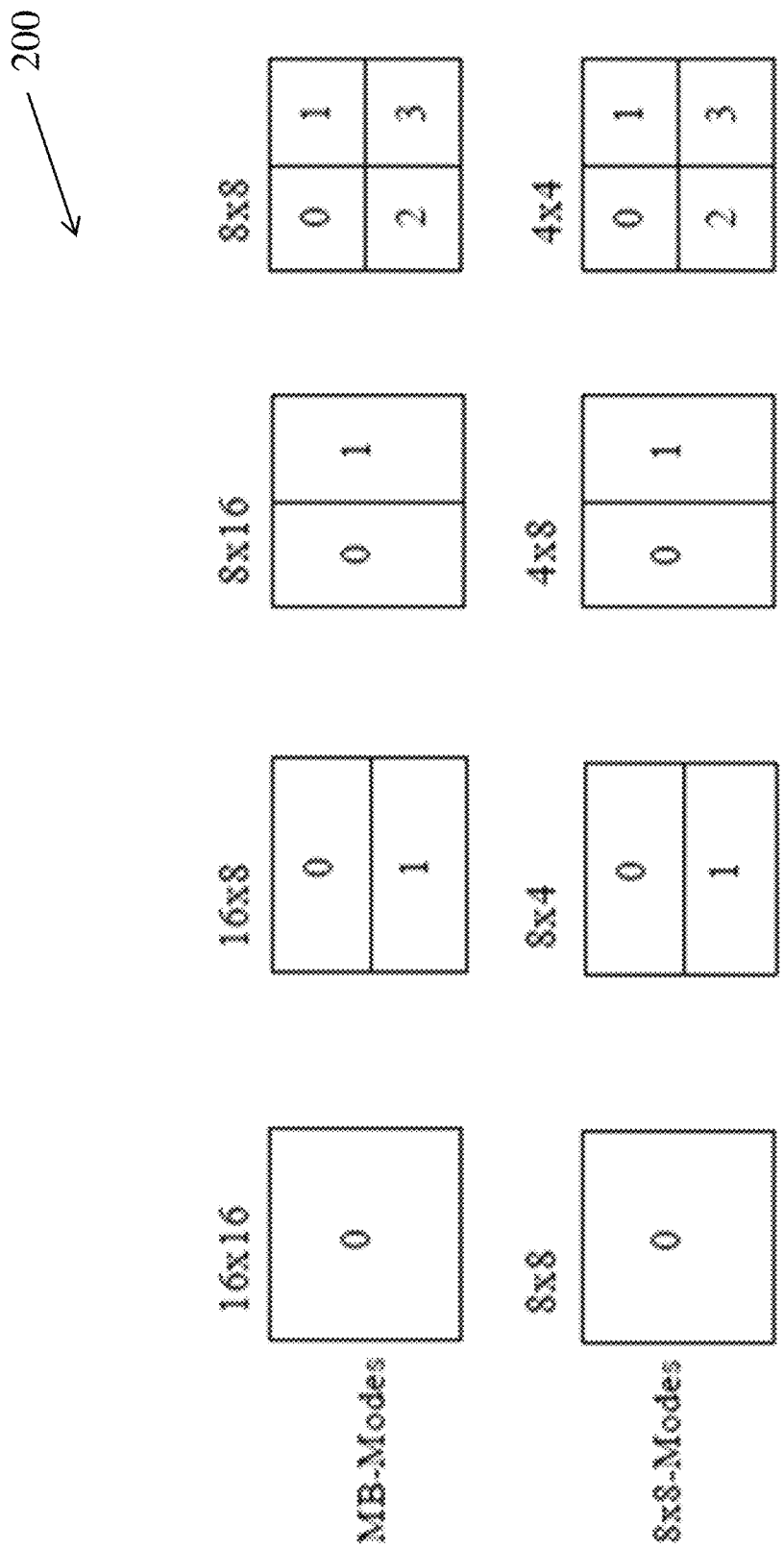
FIG. 2 shows examples of macroblock (MB) partitions in H.264/AVC.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4, as shown in FIG. 2. Only one motion vector (MV) per sub-macroblock partition is allowed.

1.2 Examples of Partition Tree Structures in HEVC

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Certain features involved in hybrid video coding using HEVC include:

(1) Coding tree units (CTUs) and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

(2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
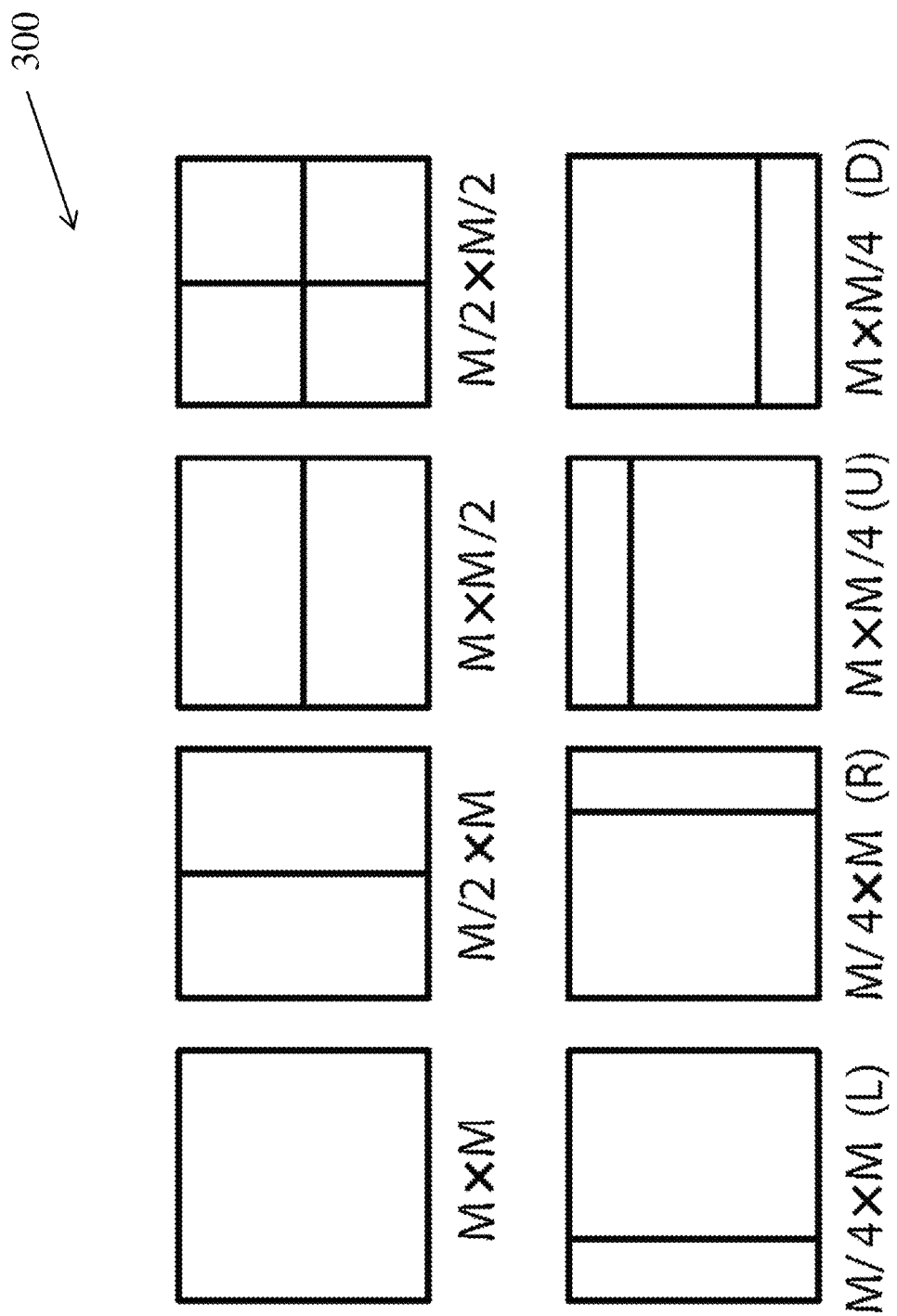
FIG. 3 shows examples of splitting coding blocks (CBs) into prediction blocks (PBs).

(3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for an M×M CU.

(4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

1.2.1. Examples of Tree-Structured Partitioning into TBs and TUs

Figure 4A:
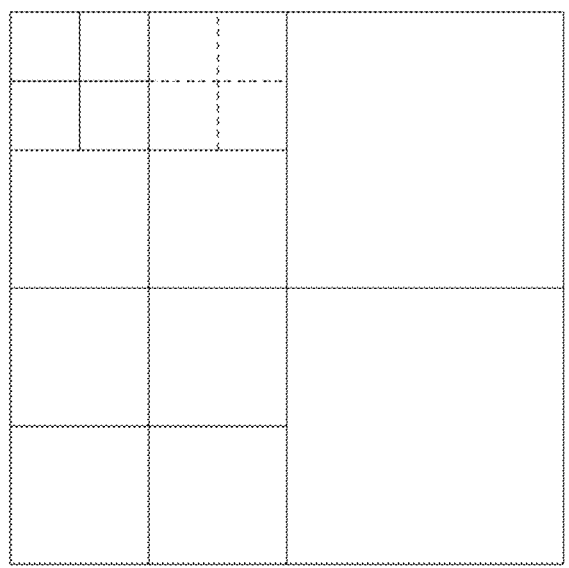
FIGS. 4A and 4B show an example of the subdivision of a coding tree block (CTB) into CBs and transform blocks (TBs), and the corresponding quadtree, respectively.
Figure 4B:
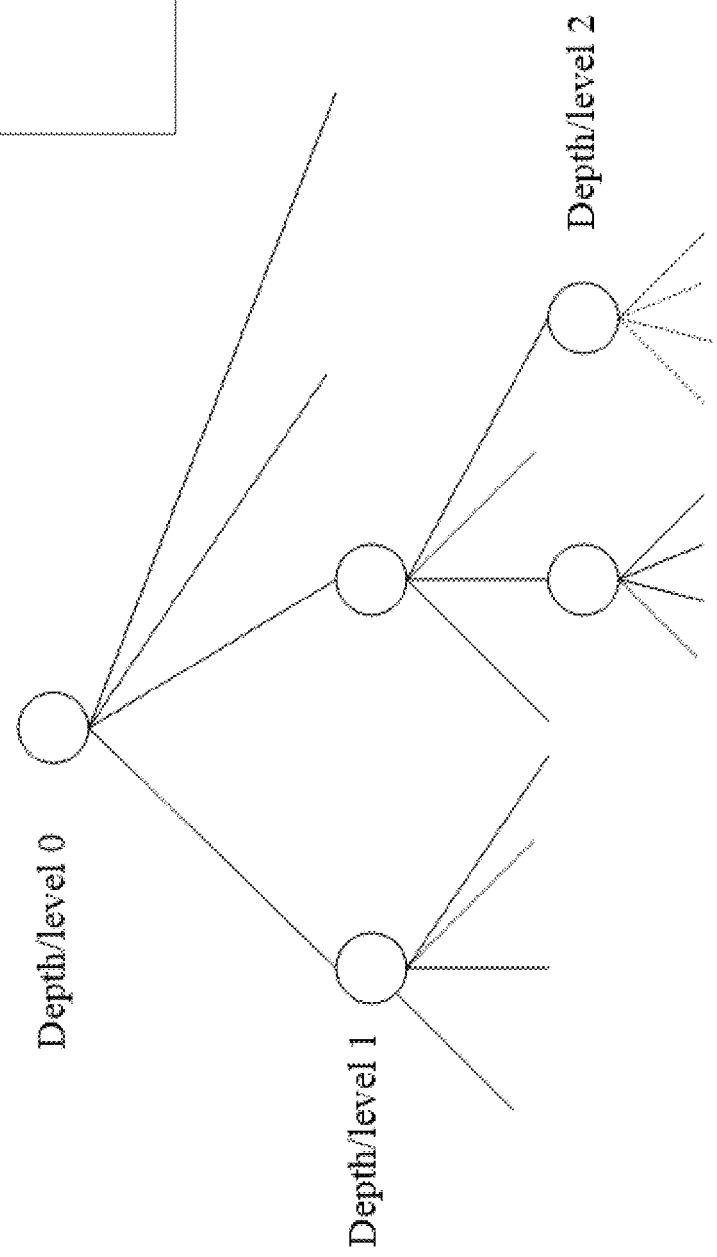

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

1.2.2. Examples of Picture Border Coding

The borders of the picture are defined in units of the minimally allowed luma CB size. As a result, at the right and bottom borders of the picture, some CTUs may cover regions that are partly outside the borders of the picture. This condition is detected by the decoder, and the CTU quadtree is implicitly split as necessary to reduce the CB size to the point where the entire CB will fit into the picture.

Figure 5:
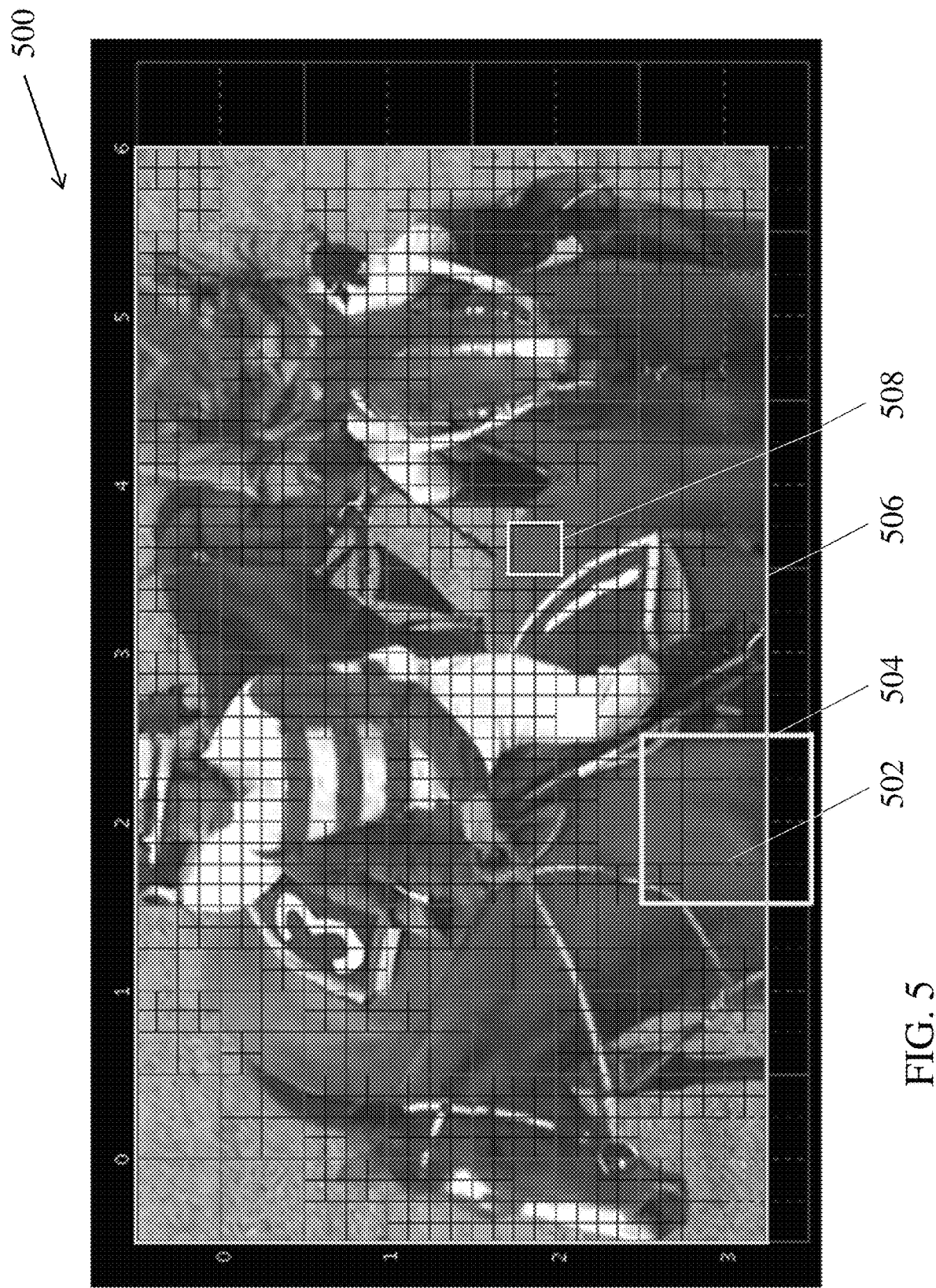
FIG. 5 shows an example of a partition structure of one frame.

FIG. 5 shows an example of a partition structure of one frame, with a resolution of 416×240 pixels and dimensions 7 CTBs×4 CTBs, wherein the size of a CTB is 64×64. As shown in FIG. 5, the CTBs that are partially outside the right and bottom border have implied splits (dashed lines, indicated as 502), and the CUs that fall outside completely are simply skipped (not coded).

Figure 6A:
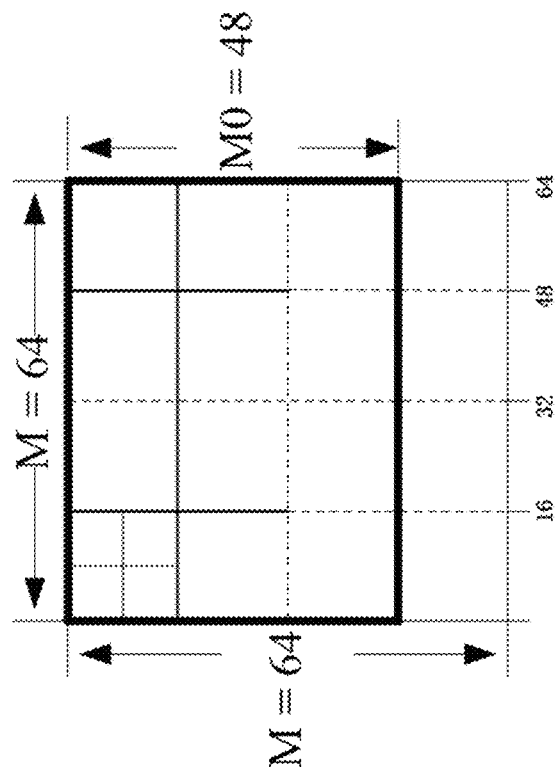
FIGS. 6A and 6B show the subdivisions and signaling methods, respectively, of a CTB highlighted in the exemplary frame in FIG. 5.
Figure 6B:
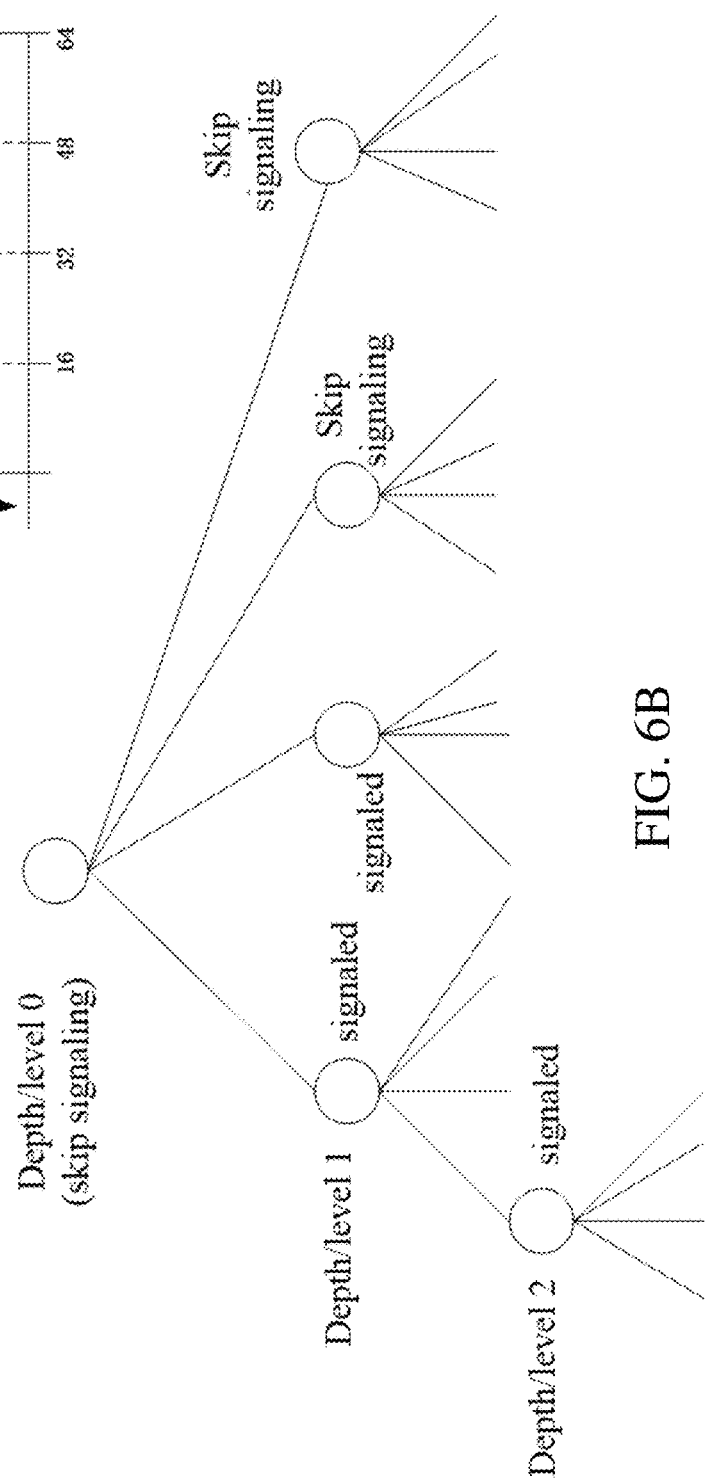

In the example shown in FIG. 5, the highlighted CTB (504), with row CTB index equal to 2 and column CTB index equal to 3, has 64×48 pixels within the current picture, and doesn't fit a 64×64 CTB. Therefore, it is forced to be split to 32×32 without the split flag signaled. For the top-left 32×32, it is fully covered by the frame. When it chooses to be coded in smaller blocks (8×8 for the top-left 16×16, and the remaining are coded in 16×16) according to rate-distortion cost, several split flags need to be coded. These split flags (one for whether split the top-left 32×32 to four 16×16 blocks, and flags for signaling whether one 16×16 is further split and 8×8 is further split for each of the four 8×8 blocks within the top-left 16×16) have to be explicitly signaled. A similar situation exists for the top-right 32×32 block. For the two bottom 32×32 blocks, since they are partially outside the picture border (506), further QT split needs to be applied without being signaled. FIGS. 6A and 6B show the subdivisions and signaling methods, respectively, of the highlighted CTB (504) in FIG. 5.

1.2.3. Examples of CTB Size Indications

An example RBSP (raw byte sequence payload) syntax table for the general sequence parameter set is shown in Table 1.

TABLE 1

| RBSP syntax structure | |
|---|---|
| | Descriptor |
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, | |
| sps_max_sub_layers_minus1 ) | |
| ... | |
|   log2_min_luma_coding_block_size_minus3 | ue(v) |
|   log2_diff_max_min_luma_coding_block_size | ue(v) |
|   log2_min_luma_transform_block_size_minus2 | ue(v) |
|   log2_diff_max_min_luma_transform_block_size | ue(v) |
|   .. | |
| } | |

The corresponding semantics includes:
log2_min_luma_coding_block_size_minus3 plus 3 specifies the minimum luma coding block size; and
log2_diff_max_min_luma_coding_block_size specifies the difference between the maximum and minimum luma coding block size.

The variables MinCbLog2SizeY, CtbLog2SizeY, MinCbSizeY, CtbSizeY, PicWidthInMinCbsY, PicWidthInCtbsY, PicHeightInMinCbsY, PicHeightInCtbsY, PicSizeInMinCbsY, PicSizeInCtbsY, PicSizeInSamplesY, PicWidthInSamplesC and PicHeightInSamplesC are derived as follows:

$$MinCbLog2SizeY = log2\_min\_luma\_coding\_block\_size\_minus3+3$$

$$CtbLog2SizeY = MinCbLog2SizeY + log2\_diff\_max\_min\_luma\_coding\_block\_size$$

$$MinCbSizeY = 1 << MinCbLog2SizeY$$

$$CtbSizeY = 1 << CtbLog2SizeY$$

$$PicWidthInMinCbsY = pic\_width\_in\_luma\_samples / MinCbSizeY$$

$$PicWidthInCtbsY = Ceil(pic\_width\_in\_luma\_samples \div CtbSizeY)$$

$$PicHeightInMinCbsY = pic\_height\_in\_luma\_samples / MinCbSizeY$$

$$PicHeightInCtbsY = Ceil(pic\_height\_in\_luma\_samples \div CtbSizeY)$$

$$PicSizeInMinCbsY = PicWidthInMinCbsY * PicHeightInMinCbsY$$

$$PicSizeInCtbsY = PicWidthInCtbsY * PicHeightInCtbsY$$

$$PicSizeInSamplesY = pic\_width\_in\_luma\_samples * pic\_height\_in\_luma\_samples$$

$$PicWidthInSamplesC = pic\_width\_in\_luma\_samples / SubWidthC$$

$$PicHeightInSamplesC = pic\_height\_in\_luma\_samples / SubHeightC$$

The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0;

Otherwise, CtbWidthC and CtbHeightC are derived as follows:

$$CtbWidthC = CtbSizeY / SubWidthC$$

$$CtbHeightC = CtbSizeY / SubHightC$$

1.3. Examples of Quadtree Plus Binary Tree Block Structures with Larger CTUs in JEM In some embodiments, future video coding technologies (Reference [3]) are explored using a reference software known as the Joint Exploration Model (JEM) (Reference [4]). In addition to binary tree structures, JEM describes quadtree plus binary tree (QTBT) and ternary tree (TT) structures.

1.3.1. Examples of the QTBT Block Partitioning Structure

Figure 7A:
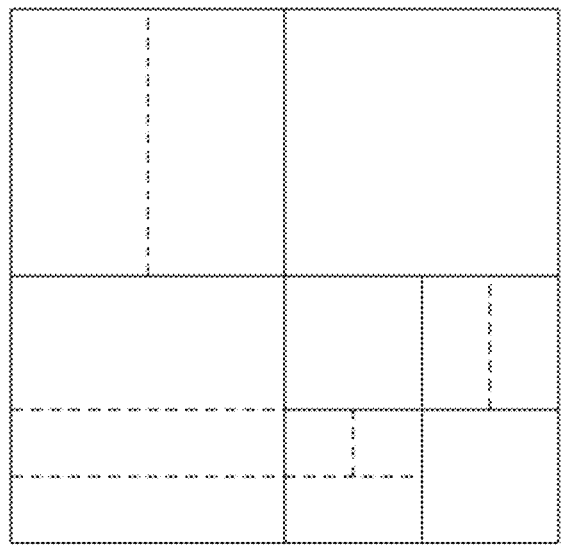
FIGS. 7A and 7B show an example of the subdivisions and a corresponding QTBT (quadtree plus binary tree) for a largest coding unit (LCU).

In contrast to HEVC (Reference [5]), the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 7A, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:
- CTU size: the root node size of a quadtree, the same concept as in HEVC
- MinQTSize: the minimally allowed quadtree leaf node size
- MaxBTSize: the maximally allowed binary tree root node size
- MaxBTDepth: the maximally allowed binary tree depth
- MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 7B:
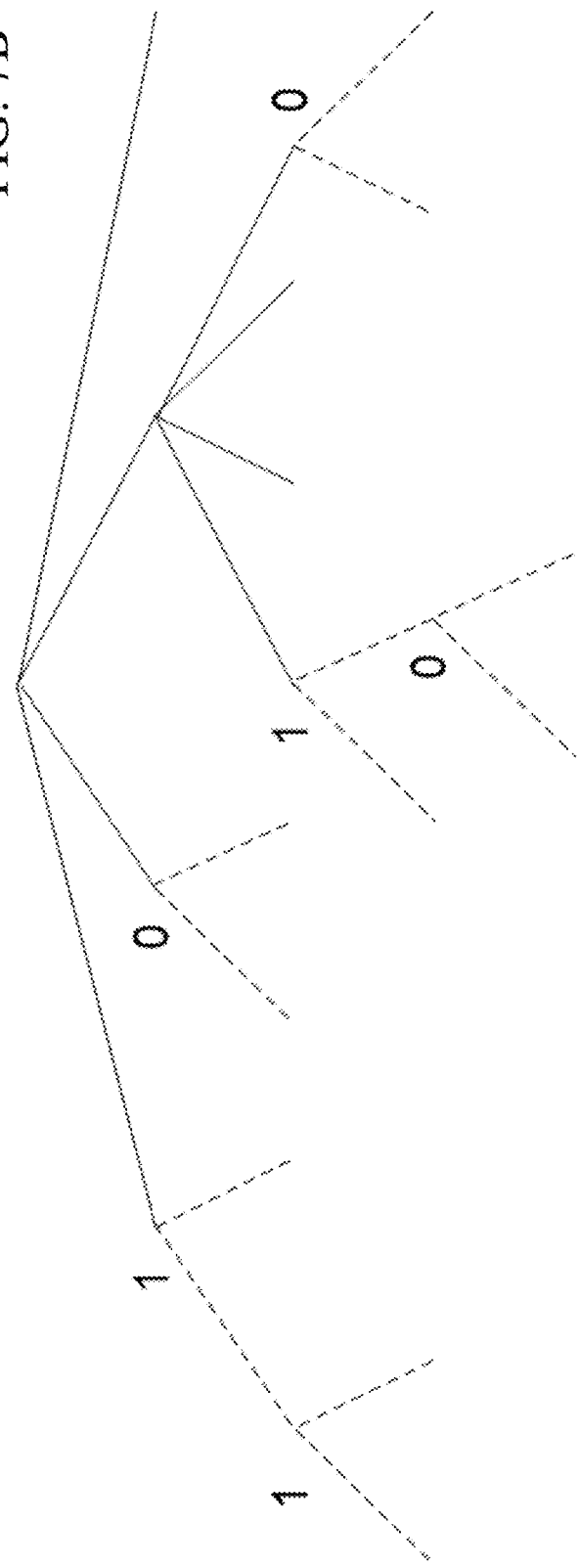

FIG. 7A shows an example of block partitioning by using QTBT, and FIG. 7B shows the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

1.4. Ternary-Tree (TT) for Versatile Video Coding (VVC)

Figure 8A:
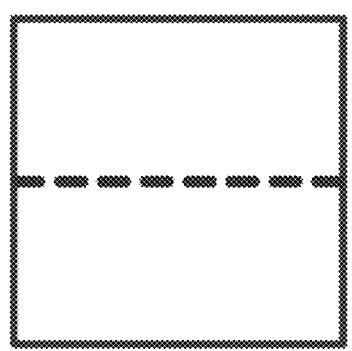
FIGS. 8A-8E show examples of partitioning a coding block.
Figure 8B:
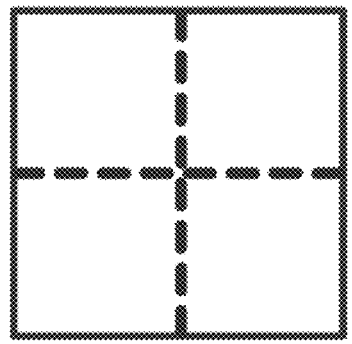
Figure 8E:
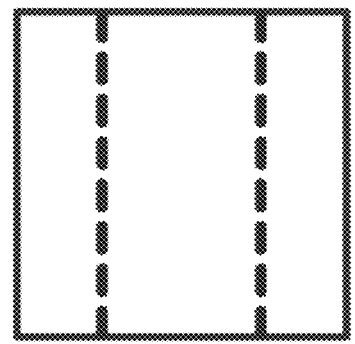
Figure 8D:
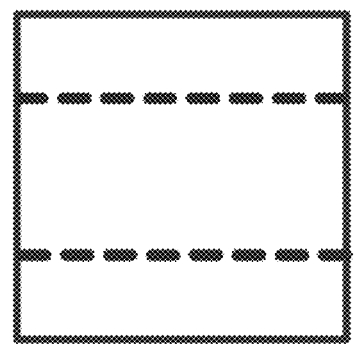
Figure 8C:
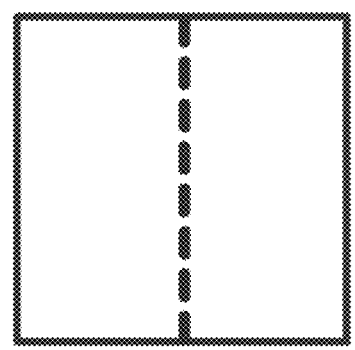

FIG. 8A shows an example of quad-tree (QT) partitioning, and FIGS. 8B and 8C show examples of the vertical and horizontal binary-tree (BT) partitioning, respectively. In some embodiments, and in addition to quad-trees and binary-trees, ternary tree (TT) partitions, e.g., horizontal and vertical center-side ternary-trees (as shown in FIGS. 8D and 8E) are supported.

In some implementations, two levels of trees are supported: region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

1.5. Examples of Partitioning Structures in Alternate Video Coding Technologies

Figure 9:
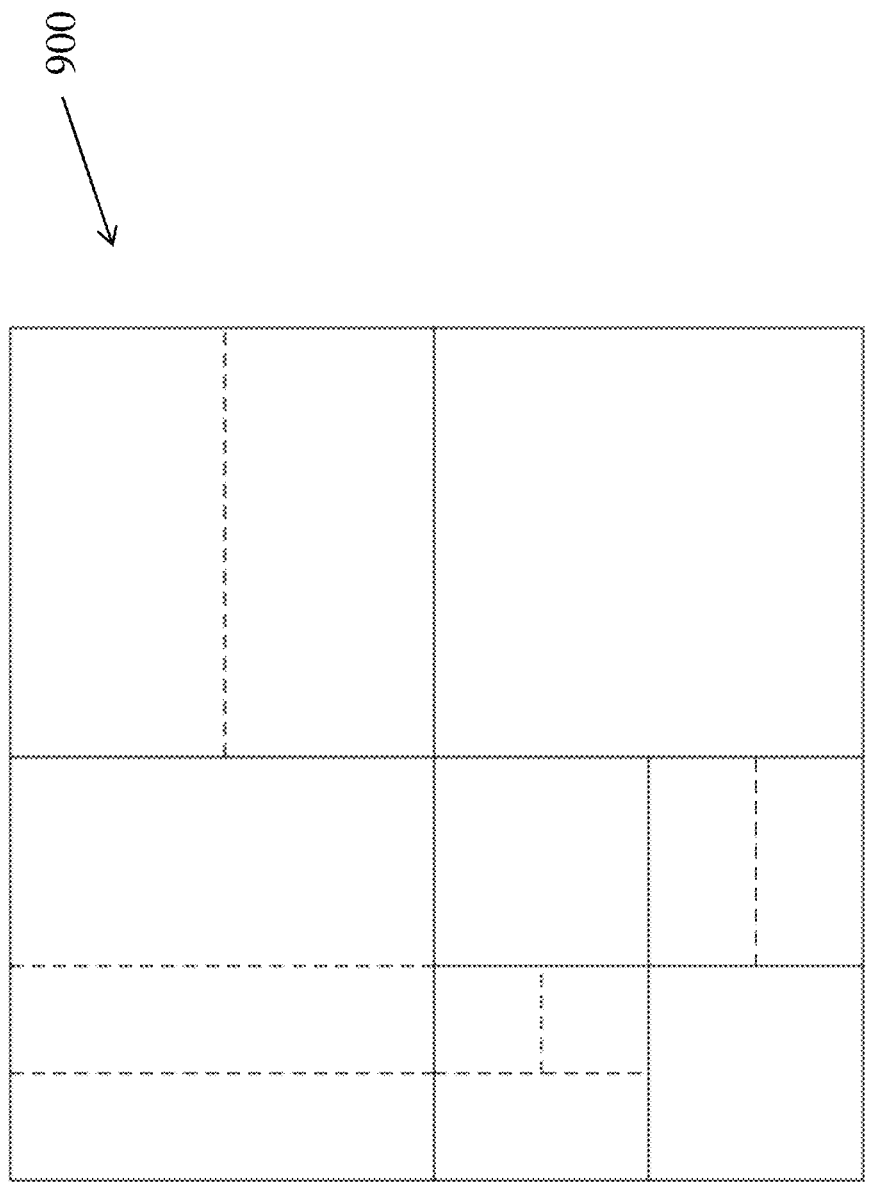
FIG. 9 shows an example subdivision of a CB based on a QTBT.
Figure 10E:
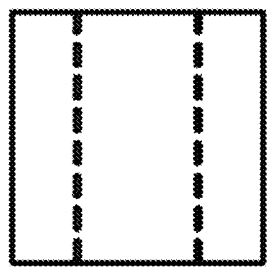
FIGS. 10A-10I show examples of the partitions of a CB supported the multi-tree type (MTT), which is a generalization of the QTBT.
Figure 10D:
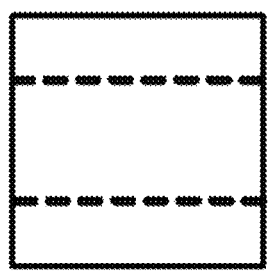
Figure 10I:
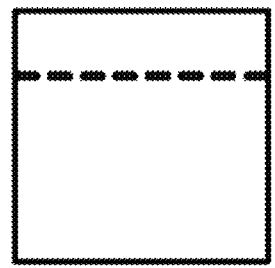
Figure 10C:
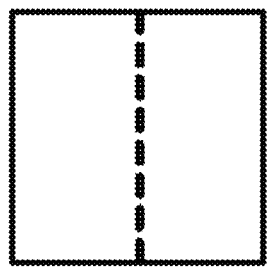
Figure 10H:
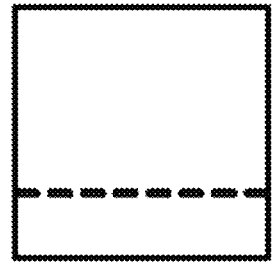
Figure 10B:
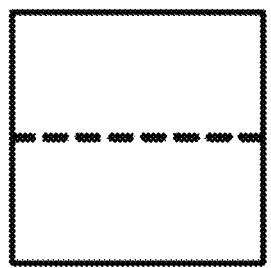
Figure 10G:
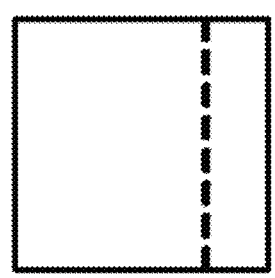
Figure 10A:
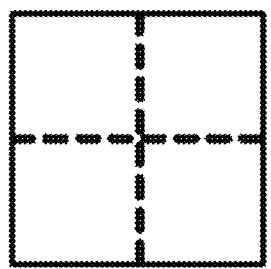
Figure 10F:
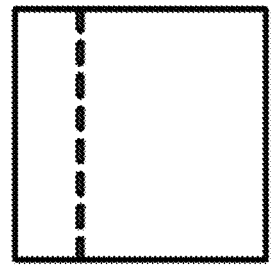

In some embodiments, a tree structure called a Multi-Tree Type (MTT), which is a generalization of the QTBT, is supported. In QTBT, as shown in FIG. 9, a Coding Tree Unit (CTU) is firstly partitioned by a quad-tree structure. The quad-tree leaf nodes are further partitioned by a binary-tree structure.

The structure of the MTT constitutes of two types of tree nodes: Region Tree (RT) and Prediction Tree (PT), supporting nine types of partitions, as shown in FIG. 10. A region tree can recursively split a CTU into square blocks down to a 4×4 size region tree leaf node. At each node in a region tree, a prediction tree can be formed from one of three tree types: Binary Tree, Ternary Tree, and Asymmetric Binary Tree. In a PT split, it is prohibited to have a quadtree partition in branches of the prediction tree. As in JEM, the luma tree and the chroma tree are separated in I slices.

Figure 11:
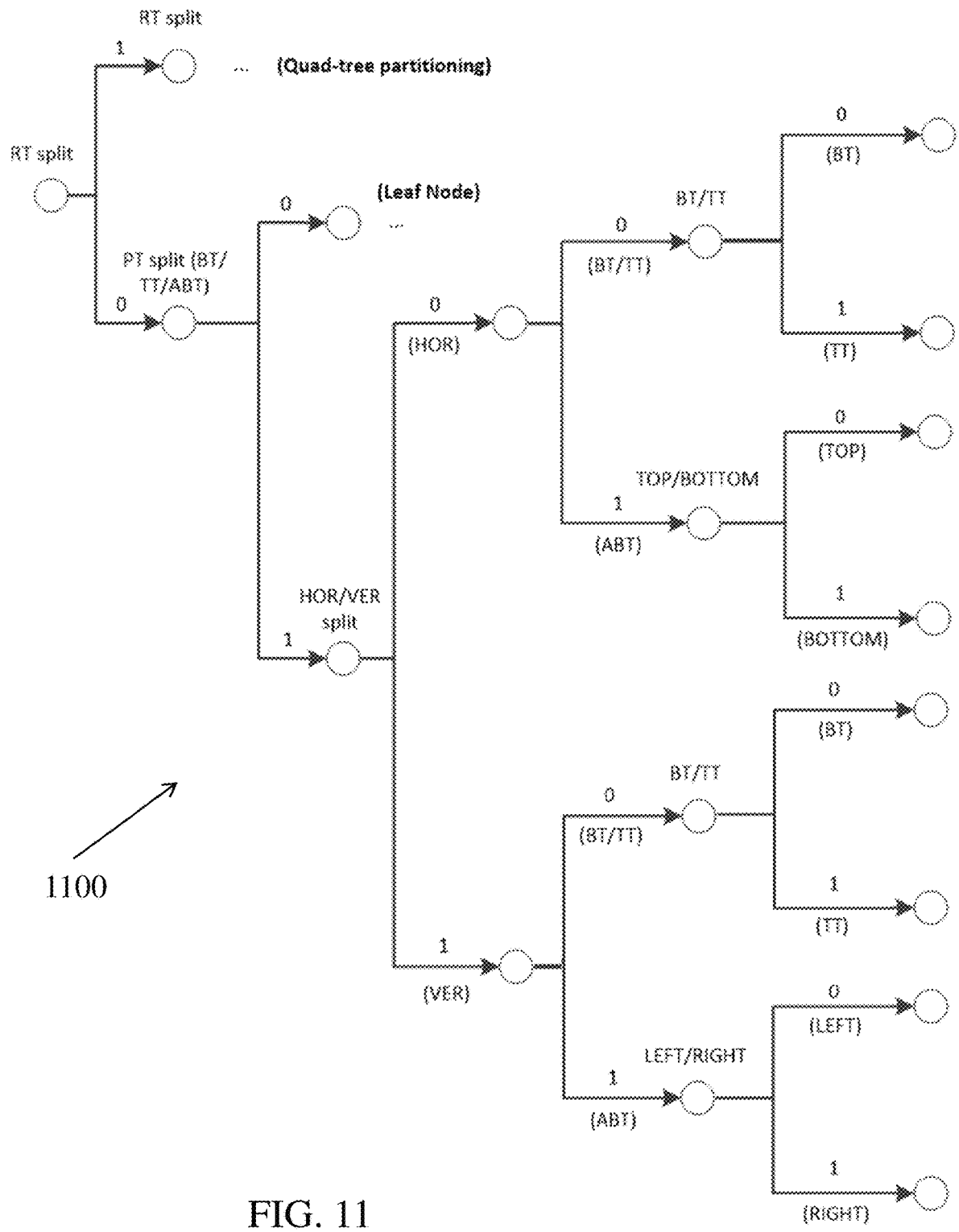
FIG. 11 shows an example of tree-type signaling.

In general, RT signaling is same as QT signaling in JEM with exception of the context derivation. For PT signaling, up to 4 additional bins are required, as shown in FIG. 11. The first bin indicates whether the PT is further split or not. The context for this bin is calculated based on the observation that the likelihood of further split is highly correlated to the relative size of the current block to its neighbors. If PT is further split, the second bin indicates whether it is a horizontal partitioning or vertical partitioning. In some embodiments, the presence of the center-sided triple tree and the asymmetric binary trees (ABTs) increase the occurrence of "tall" or "wide" blocks. The third bin indicates the tree-type of the partition, i.e., whether it is a binary-tree/triple-tree, or an asymmetric binary tree. In case of a binary-tree/triple-tree, the fourth bin indicates the type of the tree. In case of asymmetric binary trees, the four bin indicates up or down type for horizontally partitioned trees and right or left type for vertically partitioned trees.

1.5.1. Examples of Restrictions at Picture Borders

In some embodiments, if the CTB/LCU size is indicated by M×N (typically M is equal to N, as defined in HEVC/JEM), and for a CTB located at picture (or tile or slice or other kinds of types) border, K×L samples are within picture border.

Figure 12B:
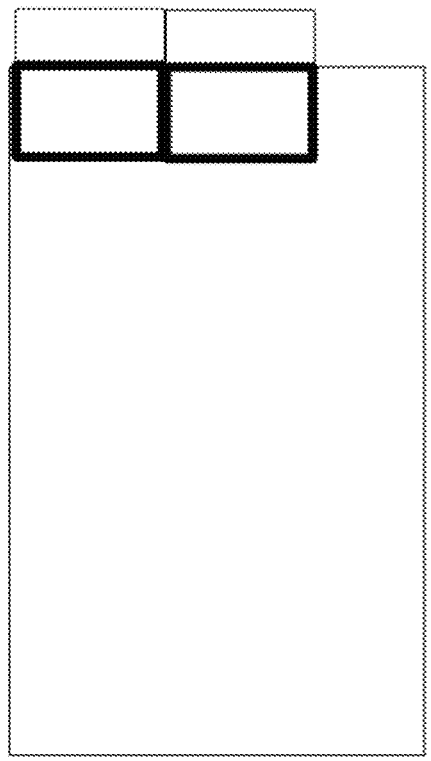
FIGS. 12A-12C show examples of CTBs crossing picture borders.
Figure 12C:
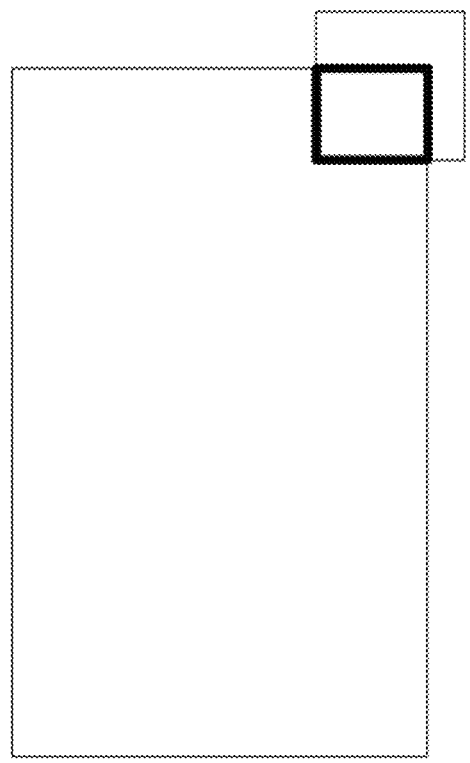
Figure 12A:
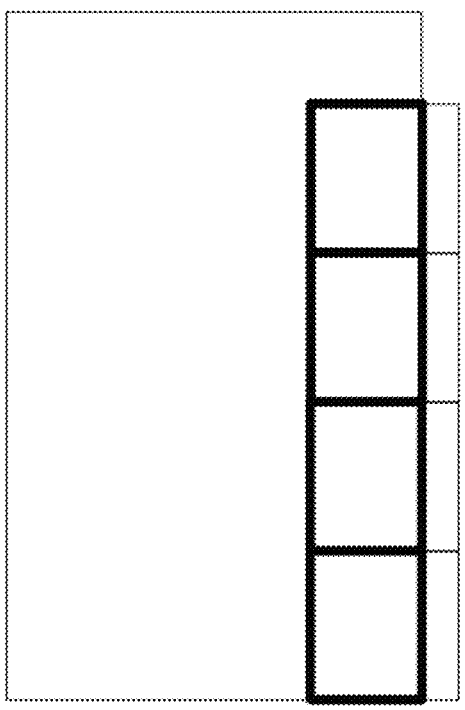

The CU splitting rules on the picture bottom and right borders may apply to any of the coding tree configuration QTBT+TT, QTBT+ABT or QTBT+TT+ABT. They include the two following aspects:

(1) If a part of a given Coding Tree node (CU) is partially located outside the picture, then the binary symmetric splitting of the CU is always allowed, along the concerned border direction (horizontal split orientation along bottom border, as shown in FIG. 12A, vertical split orientation along right border, as shown in FIG. 12B). If the bottom-right corner of the current CU is outside the frame (as depicted in FIG. 12C), then only the quad-tree splitting of the CU is allowed. In addition, if the current binary tree depth is greater than the maximum binary tree depth and current CU is on the frame border, then the binary split is enabled to ensure the frame border is reached.

(2) With respect to the ternary tree splitting process, the ternary tree split is allowed in case the first or the second border between resulting sub-CU exactly lies on the border of the picture. The asymmetric binary tree splitting is allowed if a splitting line (border between two sub-CU resulting from the split) exactly matches the picture border.

2. Examples of Existing Implementations

Existing implementations enable a flexible block partitioning approach in JEM, VTM or BMS, which brings significant coding gains, but suffers several complexity issues. In one example, the smallest luma block size may be 4×4. When bi-prediction is applied on a 4×4 block, the required bandwidth is huge.

In another example, with the 4:2:0 format, the smallest chroma block size is 2×2. In addition to a similar bandwidth issue as for the luma component, two more issues unfriendly to the hardware design are introduced:

(i) 2×N or N×2 transform and inverse-transform, and (ii) 2×N or N×2 intra-prediction.

3. Example Methods Using Block Size Restrictions Based on the Disclosed Technology Embodiments of the presently disclosed technology overcome the drawbacks of existing implementations, thereby providing video coding with higher efficiencies. Specifically, the block size of the luma and/or chroma components are used to determine how the video coding is performed, e.g., what prediction mode is selected or whether the block of video data (and the luma and chroma components) are split.

The use of block-size restrictions to improve video coding efficiency and enhance both existing and future video coding standards is elucidated in the following examples described for various implementations. The examples of the disclosed technology provided below explain general concepts, and are not meant to be interpreted as limiting. In an example, unless explicitly indicated to the contrary, the various features described in these examples may be combined. In another example, the various features described in these examples may be applied to methods for picture border coding that employ block sizes that are backward compatible and use partition trees for visual media coding.

Example 1. Suppose the current luma coding block size is M×N, Bi-prediction is not allowed for the luma component if one or more of the following cases is (are) satisfied.
(a) M<=TX and N<=TY. In one example, TX=TY=4;
(b) M<=TX or N<=TY. In one example, TX=TY=4;
(c) The current coding block applies the sub-block based prediction, such as affine prediction or ATMVP.

Example 2. Suppose the current chroma coding block size is M×N, Bi-prediction is not allowed for the chroma components if one or more of the following cases is (are) satisfied.
(a) M<=TX and N<=TY. In one example, TX=TY=2;
(b) M<=TX or N<=TY. In one example, TX=TY=2;
(c) The current coding block applies the sub-block based prediction, such as affine prediction or ATMVP.

Example 3. Whether bi-prediction is allowed or not can be different for the luma component and chroma components in the same block.

Example 4. If Bi-prediction is not allowed for a coding block, the flag or codeword to represent bi-prediction is omitted and inferred to be 0.

Figure 13:
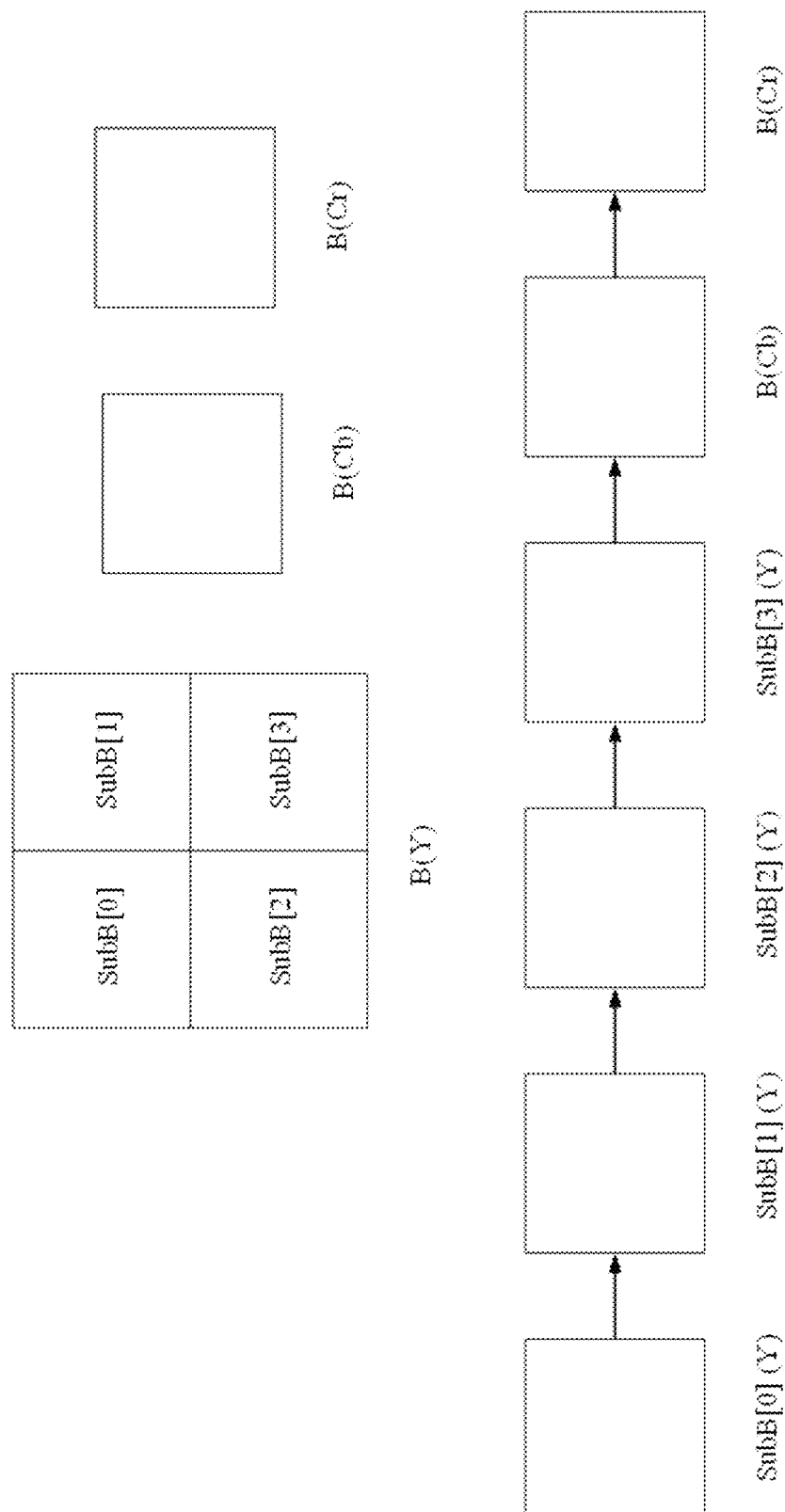
FIG. 13 shows an example encoding/decoding/signaling order if the luma component can be split but the chroma components cannot.

Example 5. Suppose the current luma coding block size is M×N, the splitting operation (such as QT, BT or TT) is only applied on the luma component but not on the chroma component if one or more of the following cases is (are) satisfied:
(a) M<=TX and N<=TY. In one example, TX=TY=8;
(b) M<=TX or N<=TY. In one example, TX=TY=8;

Example 6. If a block B is signaled to be split into X sub-CUs (For example, X=4 for QT, 3 for TT and 2 for BT), but it is inferred that the chroma components in block B cannot be split, then the encoding order, the decoding order or the signaling order can be designed as
(a) SubB[0] for Luma, SubB[1] for Luma, . . . SubB[X−1] for Luma, B for Cb component, B for Cr Component, as shown in FIG. 13.
(b) Alternatively, SubB[0] for Luma, SubB[1] for Luma, . . . SubB[X−1] for Luma, B for Cr component, B for Cb Component;
(c) Alternatively, SubB[0] for Luma, B for Cb component, B for Cr Component, SubB[1] for Luma, . . . SubB[X−1] for Luma;
(d) Alternatively, SubB[0] for Luma, B for Cr component, B for Cb Component, SubB [1] for Luma, . . . SubB [X−1] for Luma;
(e) Alternatively, B for Cb component, B for Cr Component, SubB[0] for Luma, SubB [1] for Luma, . . . SubB[X−1] for Luma;
(f) Alternatively, B for Cr component, B for Cb Component, SubB[0] for Luma, SubB [1] for Luma, . . . SubB[X−1] for Luma;
(g) It is possible SubB[0], SubB[1], . . . SubB[X−1] may be further split for the luma component.

Example 7. In one embodiment, chroma components of the block B are reconstructed after the luma component of all the sub-blocks of the block B have been reconstructed, if a block B is signaled to be split into X sub-CUs (For example, X=4 for QT, 3 for TT and 2 for BT), but it is inferred that the chroma components in block B cannot be split.

Example 8. In one embodiment, the prediction mode (intra-coded or inter-coded) for chroma components of the block B can be derived from the prediction modes of sub-CUs for the luma component if a block B is signaled to be split into X sub-CUs (For example, X=4 for QT, 3 for TT and 2 for BT), but it is inferred that the chroma components in block B cannot be split.

(a) In one example, the prediction mode (e.g., intra or inter or others; intra prediction direction, etc. al) for chroma components is derived as the prediction mode for the luma component of one subCUs, such as subCU [0] which is the first sub-CU in the encoding/decoding order.
(b) In one example, the prediction mode for chroma components is derived as the prediction mode for a sample of the luma component at a predefined position in the luma block, such as the top-left position (TL) of B, the top-right position (TR) of B, the bottom-left position (BL) of B, the bottom-right position (BR) of B and the center position (C) of B.
(c) In one example, the prediction mode for chroma components is derived as inter-coded if at least one position inside B belongs to an inter-coded CU for the luma component.
(d) In one example, the prediction mode for chroma components is derived as intra-coded if at least one position inside B belongs to an intra-coded CU for the luma component.
(e) In one example, the prediction mode for chroma components is derived as intra-coded if the area inside B belongs to intra-coded CUs is larger than that belongs to inter-coded CUs for the luma component. Otherwise, it is derived as inter-coded.

Example 9. In one embodiment, the prediction mode for chroma components of the block B can be coded separately from the luma component if a block B is signaled to be split into X sub-CUs (For example, X=4 for QT, 3 for TT and 2 for BT), but it is inferred that the chroma components in block B cannot be split.
(a) In one example, the coding of the prediction mode for chroma components depends on the coding of the prediction modes for the luma component.
(i) In one example, the prediction mode derived from the luma component is treated as the prediction for the prediction mode for chroma components.
(ii) Alternatively, the prediction mode derived from the luma component is treated as the coding context for the prediction mode for chroma components.

Example 10. In one embodiment, the MV for chroma components of the block B can be derived from the MVs of sub-CUs for the luma component if a block B is signaled to be split into X sub-CUs (For example, X=4 for QT, 3 for TT and 2 for BT), but it is inferred that the chroma components in block B cannot be split.
(a) In one example, the MV for chroma components is derived as the MV for the luma component of one subCUs, such as subCU[0].
(b) In one example, the MV for chroma components is derived as the MV for the luma component at a predefined position, such as the top-left position (TL) of B, the top-right position (TR) of B, the bottom-left position (BL) of B, the bottom-right position (BR) of B and the center position (C) of B.
(c) In one example, the MV for chroma components is derived as the first found MV of the luma component at a series of predefined positions in a checking order. For example, the series of predefined positions in the checking order are {C, TL, TR, BL, BR}, then C, TL, TR, BL and BR are checked one by one, the first one that belongs to an inter-coded CU is selected and the associated MV is chosen as the MV for chroma components.

(d) In one example, the MV for chroma components is derived as the MV of sub-CU S for the luma component if the prediction mode for chroma components is derived from sub-CU S.
(e) In one example, the MV for chroma components is derived as the MV of position P for the luma component if the prediction mode for chroma components is derived from position P.
(f) In one example, the MV for chroma components is derived as a function of the MVs for the luma component from several subCUs or at several positions. Exemplary functions are average( ), minimum( ), maximum( ), or median( ).
(g) The MV for chroma components derived from MV for the luma component may be scaled before motion compensation for chroma components. For example, MV_chroma_x=MV_luma_x>>scaleX, MV_chroma_y=MV_luma_y>>scaleY, where scaleX=scaleY=1 for the 4:2:0 format.

Example 11. In one embodiment, the motion information syntax element E (such as skip flag, merge flag, merge index, inter direction (L0, L1 or Bi), reference index, my difference (mvd), my candidate index, affine flag, is flag, imv flag ect.) for chroma components of the block B can be derived from Es of sub-CUs for the luma component if a block B is signaled to be split into X sub-CUs (For example, X=4 for QT, 3 for TT and 2 for BT), but it is inferred that the chroma components in block B cannot be split.
(a) In one example, E for chroma components is derived as E for the luma component of one subCUs, such as subCU[0].
(b) In one example, E for chroma components is derived as E for the luma component at a predefined position, such as the top-left position (TL) of B, the top-right position (TR) of B, the bottom-left position (BL) of B, the bottom-right position (BR) of B and the center position (C) of B.
(c) In one example, E for chroma components is derived as the first found E of the luma component at a series of predefined positions in a checking order. For example, the series of predefined positions in the checking order are {C, TL, TR, BL, BR}, then C, TL, TR, BL and BR are checked one by one, the first one that belongs to an inter-coded CU is selected and the associated E is chosen as the E for chroma components.
(d) In one example, E for chroma components is derived as E of sub-CU S for the luma component if the prediction mode for chroma components is derived from sub-CUS.
(e) In one example, E for chroma components is derived as E of position P for the luma component if the prediction mode for chroma components is derived from position P.
(f) In one example, E for chroma components is derived as a function of the Es for the luma component from several subCUs or at several positions. Exemplary functions are operator "and", operator "or", average( ), minimum( ), maximum( ), or median( ).

Example 12. In one embodiment, the MVs for chroma components of the block B can be coded separately from the luma component if a block B is signaled to be split into X sub-CUs (For example, X=4 for QT, 3 for TT and 2 for BT), but it is inferred that the chroma components in block B cannot be split.
(a) In one example, the coding of the motion information syntax element E (such as skip flag, merge flag, merge index, inter direction (L0, L1 or Bi), reference index, my difference (mvd), my candidate index, affine flag, is flag, imv flag ect.) for chroma components depends on Es for the luma component.
  (i) In one example, the E derived from the luma component is treated as the prediction for the E for chroma components.
  (ii) Alternatively, the E derived from the luma component is treated as the coding context to code the E for chroma components.

Example 13. In one embodiment, the intra prediction mode (IPM) (such as DC, Planar, vertical etc.) for chroma components of the block B can be derived from the intra prediction mode of sub-CUs for the luma component if a block B is signaled to be split into X sub-CUs (For example, X=4 for QT, 3 for TT and 2 for BT), but it is inferred that the chroma components in block B cannot be split.
(a) In one example, the IPM for chroma components is derived as the IPM for the luma component of one subCUs, such as subCU[0].
(b) In one example, the IPM for chroma components is derived as the IPM for the luma component at a predefined position, such as the top-left position (TL) of B, the top-right position (TR) of B, the bottom-left position (BL) of B, the bottom-right position (BR) of B and the center position (C) of B.
(c) In one example, the IPM for chroma components is derived as the first found IPM of the luma component at a series of predefined positions in a checking order. For example, the series of predefined positions in the checking order are {C, TL, TR, BL, BR}, then C, TL, TR, BL and BR are checked one by one, the first one that belongs to an intra-coded CU is selected and the associated IPM is chosen as the IPM for chroma components.
(d) In one example, the IPM for chroma components is derived as the IPM of sub-CU S for the luma component if the prediction mode for chroma components is derived from sub-CU S.
(e) In one example, the IPM for chroma components is derived as the IPM of position P for the luma component if the prediction mode for chroma components is derived from position P.
(f) In one example, the IPM for chroma components is derived as a function of the IPMs for the luma component from several subCUs or at several positions. Exemplary functions are average( ), minimum( ), maximum( ), or median( ).
  (i) Alternatively, the IPM for chroma components is derived as Planar if at least one IPM for the luma component from several subCUs or at several positions is Planar;
  (ii) Alternatively, the IPM for chroma components is derived as DC if at least one IPM for the luma component from several subCUs or at several positions is DC;

Example 14. In one embodiment, the IPM for chroma components of the block B can be coded separately from the luma component if a block B is signaled to be split into X sub-CUs (For example, X=4 for QT, 3 for TT and 2 for BT), but it is inferred that the chroma components in block B cannot be split.
(a) In one example, the coding of IPM for chroma components depends on cbfs for the luma component.
  (i) In one example, the IPM derived from the luma component is treated as the prediction for the IPM for chroma components. In a further example, one or more IPMs derived from the luma component is treated as one or more DM modes for the chroma components.

(ii) Alternatively, the IPM derived from the luma component is treated as the coding context to code the IPM for chroma components.

Example 15. In one embodiment, the coded block flag (cbf) (it is 0 if no residuals are coded) for chroma components of the block B can be derived from the cbf of sub-CUs for the luma component if a block B is signaled to be split into X sub-CUs (For example, X=4 for QT, 3 for TT and 2 for BT), but it is inferred that the chroma components in block B cannot be split.

(a) In one example, the cbf for chroma components is derived as the cbf for the luma component of one subCUs, such as subCU[0] which is the first sub-CU in the encoding/decoding order.

(b) In one example, the cbf for chroma components is derived as the cbf for a sample of the luma component at a predefined position in the luma block, such as the top-left position (TL) of B, the top-right position (TR) of B, the bottom-left position (BL) of B, the bottom-right position (BR) of B and the center position (C) of B.

(c) In one example, the cbf for chroma components is derived as the first found non-zero cbf of the luma component at a series of predefined positions in a checking order. For example, the series of predefined positions in the checking order are {C, TL, TR, BL, BR}, then C, TL, TR, BL and BR are checked one by one, the first one that not equal to zero is selected and the associated cbf is chosen as the cbf for chroma components.

(d) In one example, the cbf for chroma components is derived as the first found zero cbf of the luma component at a series of predefined positions in a checking order. For example, the series of predefined positions in the checking order are {C, TL, TR, BL, BR}, then C, TL, TR, BL and BR are checked one by one, the first one that equal to zero is selected and the associated cbf is chosen as the cbf for chroma components.

(e) In one example, the IPM for chroma components is derived as the IPM of sub-CU S for the luma component if the prediction mode for chroma components is derived from sub-CU S.

(f) In one example, the IPM for chroma components is derived as the IPM of position P for the luma component if the prediction mode for chroma components is derived from position P.

(g) In one example, the cbf for chroma components is derived as a function of the cbfs for the luma component from several subCUs or at several positions. Exemplary functions are operator "and", operator "or", minimum( ), and maximum( ).

(h) In one example, only cbfs from sub-CUs or positions for the luma component coded by the intra mode is under consideration if the chroma component is coded by the intra mode.

(i) In one example, only cbfs from sub-CUs or positions for the luma component coded by the inter mode is under consideration if the chroma component is coded by the inter mode.

Example 16. In one embodiment, the cbf for chroma components of the block B can be coded separately from the luma component if a block B is signaled to be split into X sub-CUs (For example, X=4 for QT, 3 for TT and 2 for BT), but it is inferred that the chroma components in block B cannot be split.

(a) In one example, the coding of cbf for chroma components depends on cbfs for the luma component.

(i) In one example, the cbf derived from the luma component is treated as the prediction for the cbf for chroma components.

(ii) Alternatively, the cbf derived from the luma component is treated as the coding context to code the cbf for chroma components.

Example 17. The in-loop filtering should be conducted differently for luma and chroma components. In one example, in-loop filtering is conducted at boundaries of CUs inside block B for the luma component, but not conducted for chroma components, if a block B is signaled to be split into X sub-CUs (For example, X=4 for QT, 3 for TT and 2 for BT), but it is inferred that the chroma components in block B cannot be split.

Example 18. Whether and how to apply the restrictions can be predefined, or they can be transmitted from the encoder to the decoder. For example, they can be signaled in Video Parameter Set (VPS), Sequence Parameter Set (SPS), Picture Parameter Set (PPS), Slice header, Coding Tree Unit (CTU) or Coding Unit (CU).

The examples described above may be incorporated in the context of the methods described below, e.g., method 1400, which may be implemented at a video decoder and/or video encoder.

Figure 14:
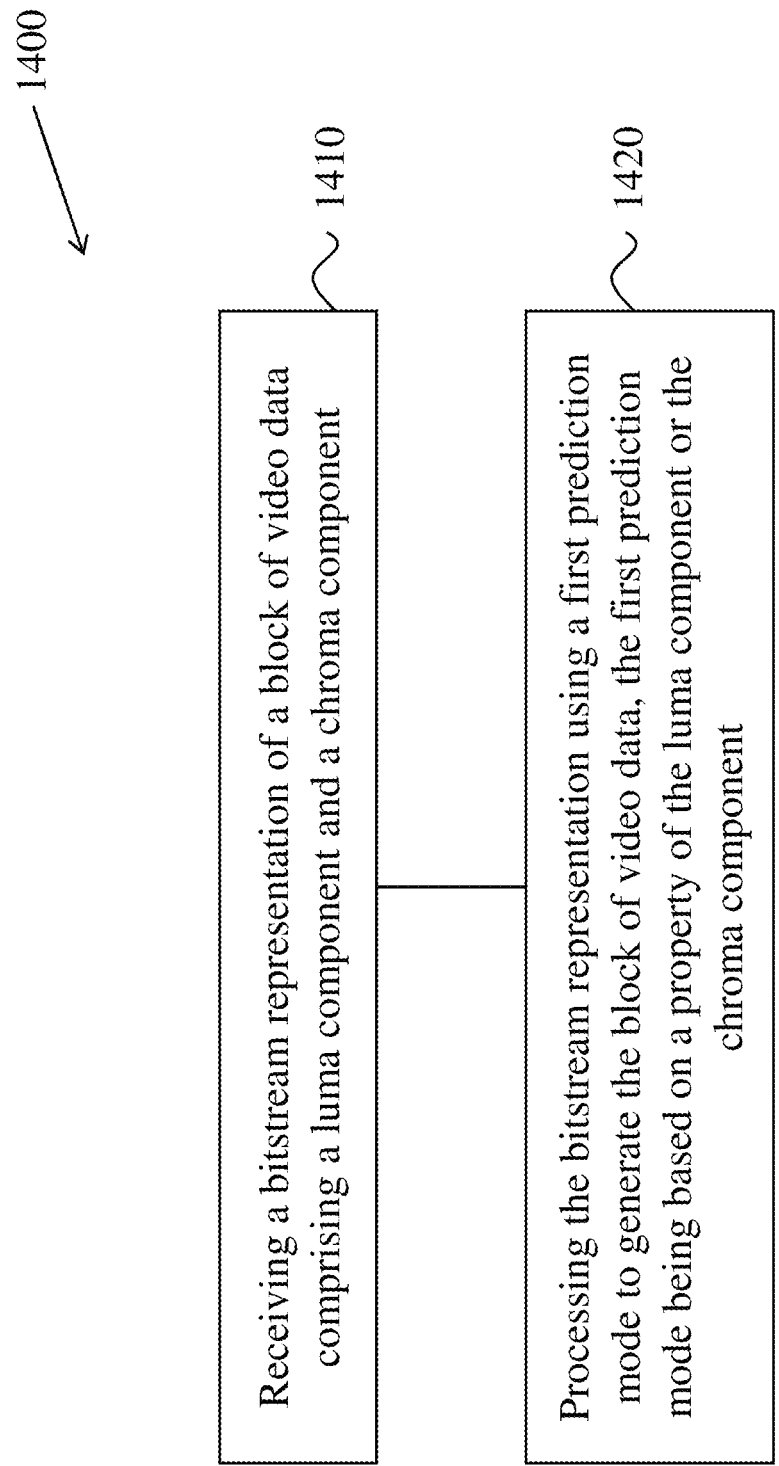
FIG. 14 shows a flowchart of an example method for video coding in accordance with the presently disclosed technology.

FIG. 14 shows a flowchart of an exemplary method for video coding, which may be implemented in a video encoder. The method 1400 includes, at step 1410, receiving a bitstream representation of a block of video data comprising a luma component and a chroma component.

The method 1400 includes, at step 1420, processing the bitstream representation using a first prediction mode to generate the block of video data, where the first prediction mode is based on a property of the luma component or the chroma component. In some embodiments, the property includes dimensions of the luma component or the chroma component.

In some embodiments, the first prediction mode is not a bi-prediction mode, and the first prediction mode for the luma component is different from a second prediction mode for the chroma component. In other embodiments, the first prediction mode is not a bi-prediction mode, and the first prediction mode for the luma component is identical to a second prediction mode for the chroma component.

The method 1400 may further include performing a splitting operation on the luma component or the chroma component. In some embodiments, a size of the luma component is M×N, where M≤TX and/or N≤TY with TX and TY being integer thresholds, and where the splitting operation is performed on the luma component and not on the chroma component.

The method 1400 may further include performing, based on the property, a splitting operation on the block of video data to generate sub-blocks. In some embodiments, the chroma component cannot be split, and the splitting operation is performed on the luma component to generate luma components for each of the sub-blocks.

In an example, the chroma component is reconstructed after the luma components of the sub-blocks have been reconstructed.

In another example, the a characteristic of the chroma component is derived from the same characteristic of the luma components of the sub-blocks. In other words, characteristics from one of the luma sub-blocks can be copied over to the chroma block. The characteristic may be, but is not limited to, a prediction mode, motion vectors, a motion information syntax element, an intra prediction mode (IPM), or a coded block flag. In some embodiments, the motion information syntax element may be a skip flag, a merge flag, a merge index, an inter direction, a reference index, a motion vector candidate index, an affine flag, an illumination compensation flag or an integer motion vector flag.

In some embodiments, the property or an indication of the property, or more generally, a determination of whether or not to perform one of the operations elucidated in the examples described above, is signaled in a Video Parameter Set (VPS), a Sequence Parameter Set (SPS), a Picture Parameter Set (PPS), a slice header, a coding tree unit (CTU) or a coding unit (CU).

4. Example Implementations of the Disclosed Technology

Figure 15:
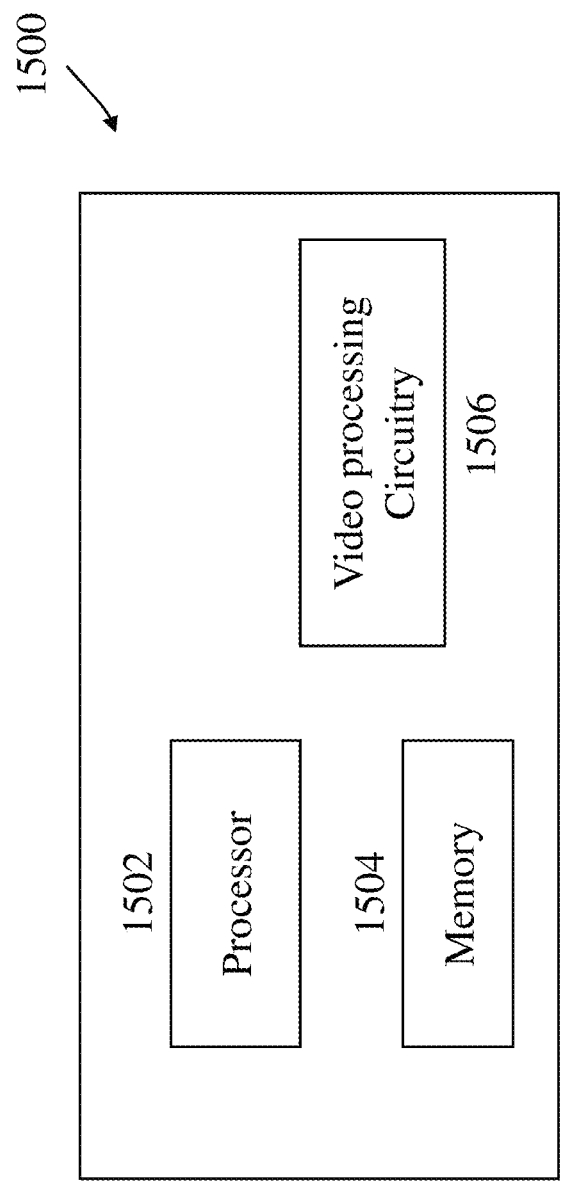
FIG. 15 is a block diagram of an example of a hardware platform for implementing a visual media decoding or a visual media encoding technique described in the present document.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods (including, but not limited to, method 1400) described in the present document. The memory (memories) 1504 may be used for storing data and code used for implementing the methods and techniques described herein. The video processing hardware 1506 may be used to implement, in hardware circuitry, some techniques described in the present document.

In some embodiments, a video decoder apparatus may implement a method of using zero-units as described herein is used for video decoding. The various features of the method may be similar to the above-described method 1400.

In some embodiments, the video decoding methods may be implemented using a decoding apparatus that is implemented on a hardware platform as described with respect to FIG. 15.

Figure 16:
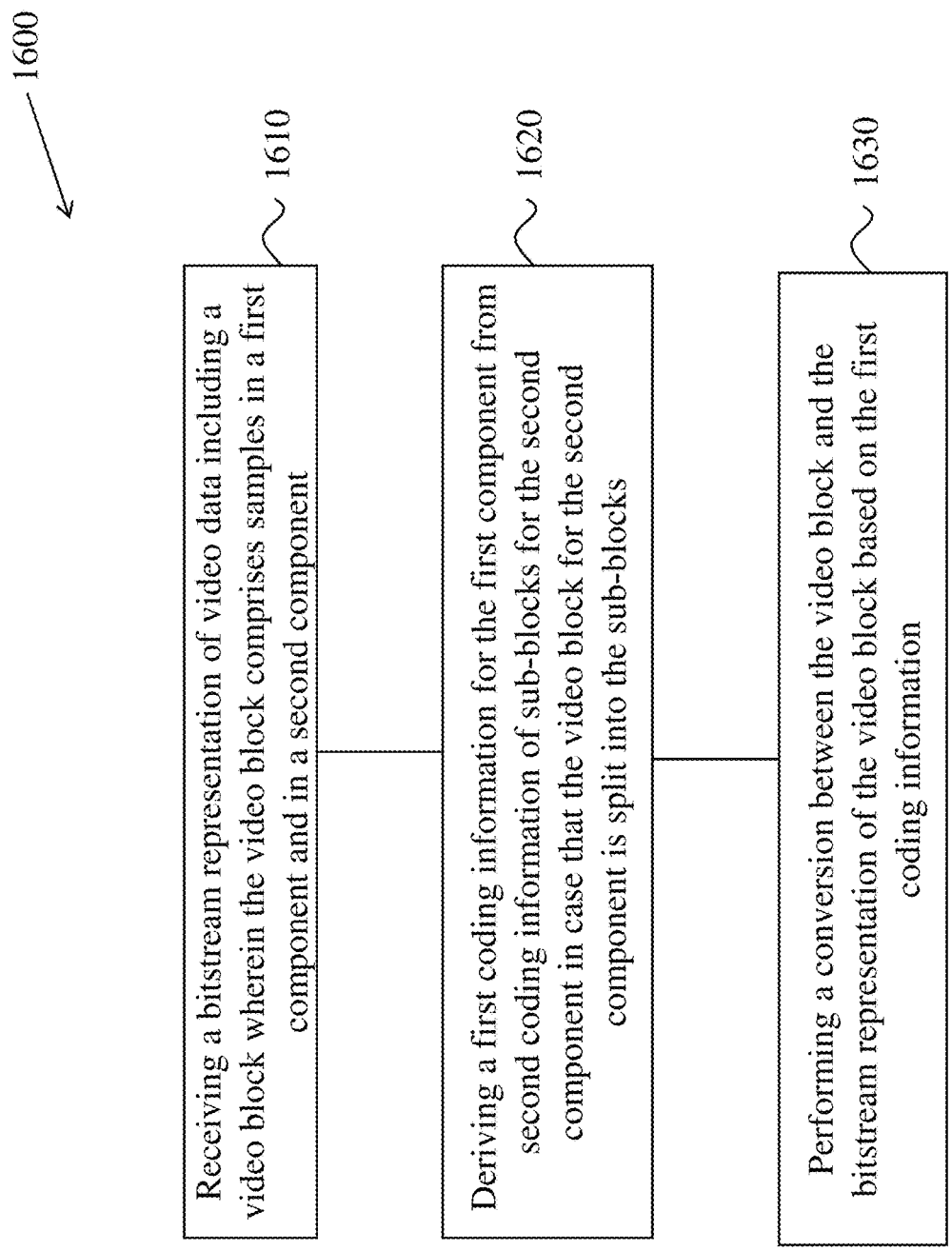
FIG. 16 shows a flowchart of an example method for video processing in accordance with the presently disclosed technology.

FIG. 16 shows a flowchart of an exemplary method for video processing, which may be implemented in a video encoder/decoder. The method 1600 includes, at step 1610, receiving a bitstream representation of video data including a video block wherein the video block comprises samples in a first component and in a second component.

The method 1600 includes, at step 1620, deriving a first coding information for the first component from second coding information of sub-blocks for the second component in case that the video block for the second component is split into the sub-blocks.

The method 1600 includes, at step 1630, performing a conversion between the video block and the bitstream representation of the video block based on the first coding information.

Figure 17:
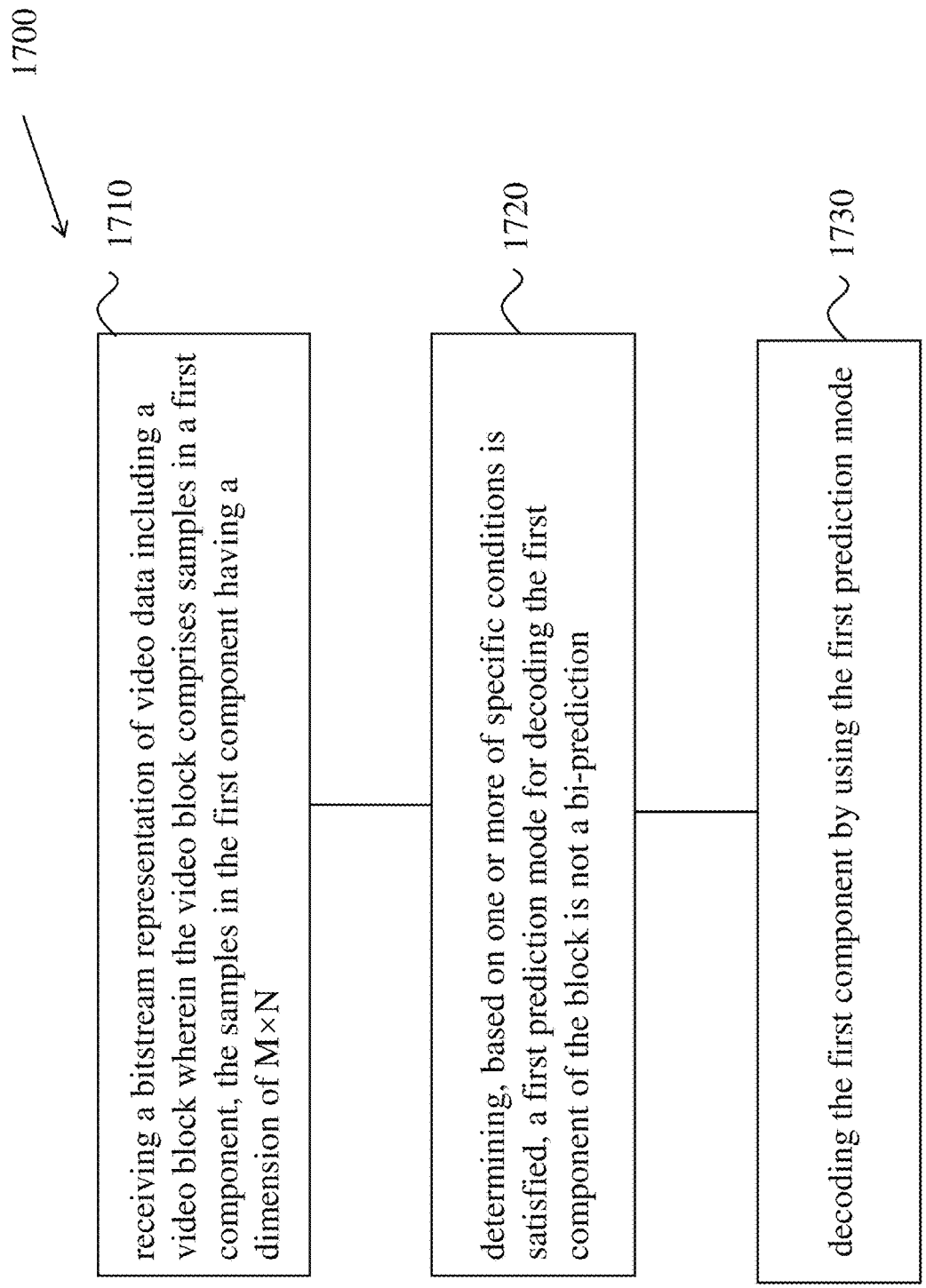
FIG. 17 shows a flowchart of another example method for video decoding in accordance with the presently disclosed technology.

FIG. 17 shows a flowchart of an exemplary method for video decoding, which may be implemented at a video decoding side.

As shown in FIG. 17, the method 1700 includes, at step 1710, receiving a bitstream representation of video data including a video block wherein the video block comprises samples in a first component, the samples in the first component having a dimension of M×N.

The method 1700 further includes, at step 1720, determining, based on one or more specific conditions is satisfied, a first prediction mode for decoding the first component of the block is not a bi-prediction.

The method 1700 further includes, at step 1730, decoding the first component by using the first prediction mode.

Figure 18:
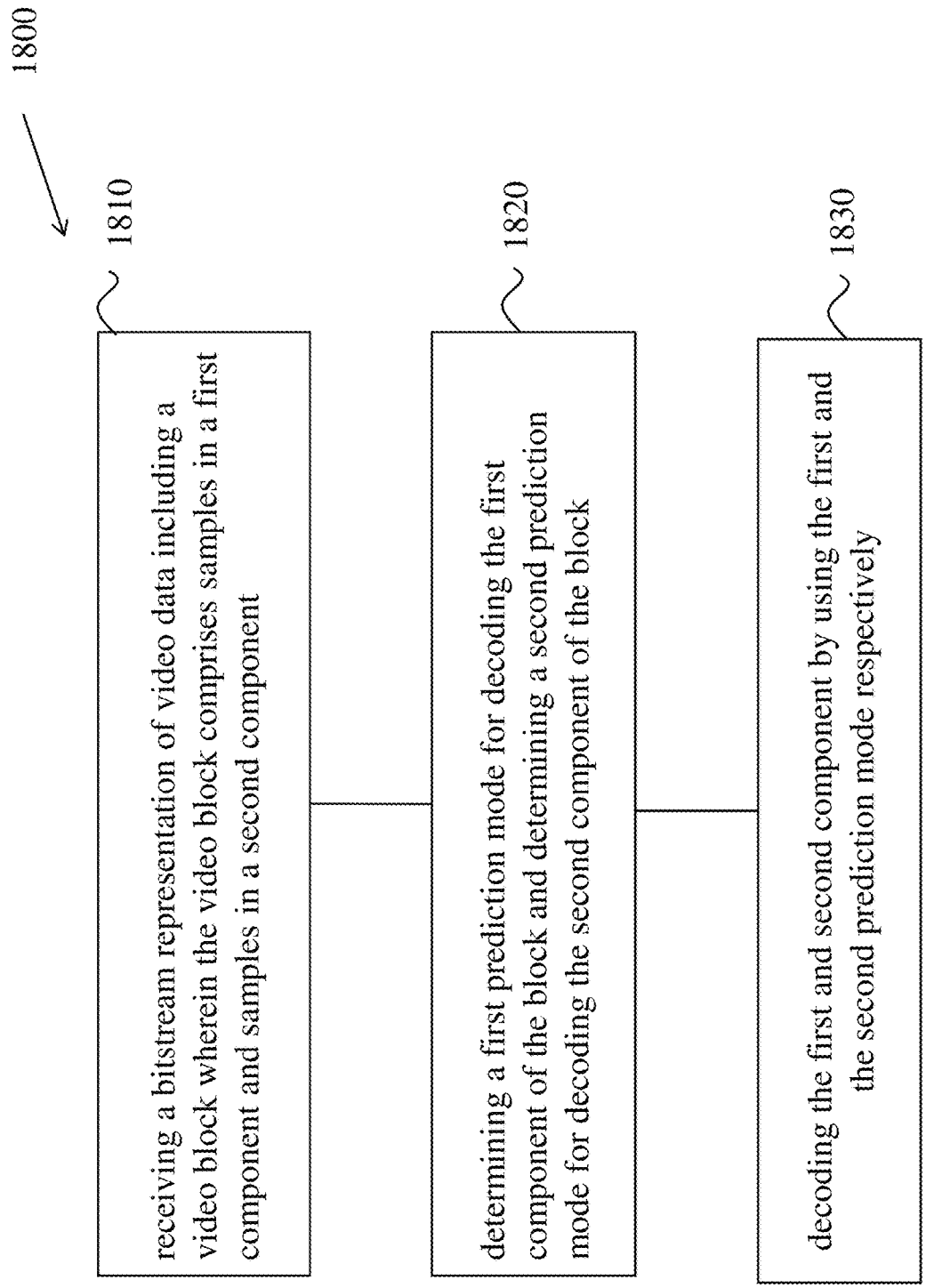
FIG. 18 shows a flowchart of another example method for video decoding in accordance with the presently disclosed technology.

FIG. 18 shows a flowchart of another example method for video decoding in accordance with the presently disclosed technology.

As shown in FIG. 18, the method 1800 includes, at step 1810, receiving a bitstream representation of video data including a video block wherein the video block comprises samples in a first component and samples in a second component.

The method 1800 includes, at step 1820, determining a first prediction mode for decoding the first component of the block and determining a second prediction mode for decoding the second component of the block.

The method 1800 includes, at step 1830, decoding the first and second component by using the first and the second prediction mode respectively.

Figure 19:
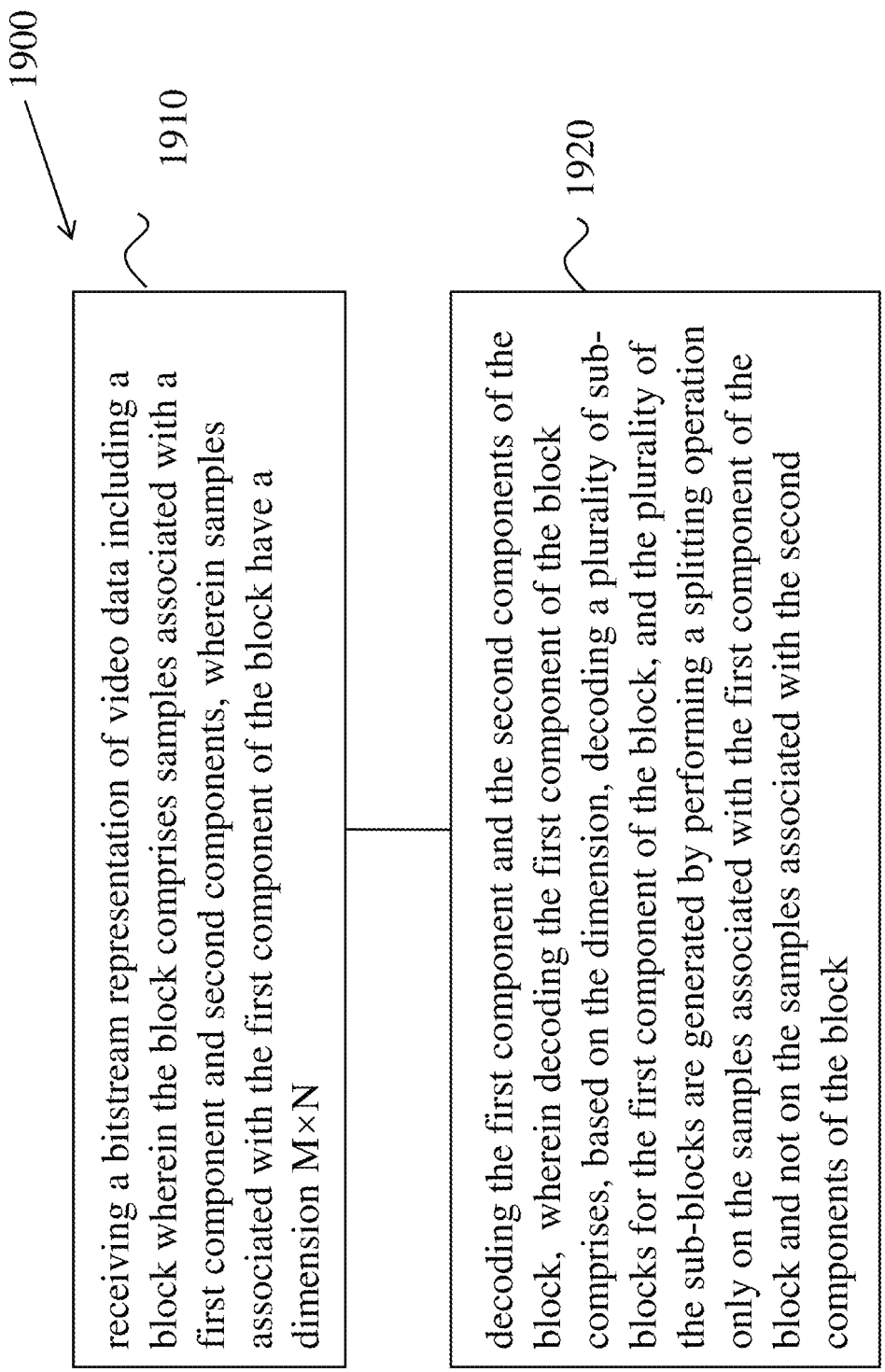
FIG. 19 shows a flowchart of another example method for video decoding in accordance with the presently disclosed technology.

FIG. 19 shows a flowchart of another example method for video decoding in accordance with the presently disclosed technology.

As shown in FIG. 19, the method 1900 includes, at step 1910, receiving a bitstream representation of video data including a block wherein the block comprises samples associated with a first component and second components, wherein samples associated with the first component of the block have a dimension M×N.

The method 1900 includes, at step 1920, decoding the first component and the second components of the block; wherein decoding the first component of the block comprises, based on the dimension, decoding a plurality of sub-blocks for the first component of the block, and the plurality of the sub-blocks are generated by performing a splitting operation only on the samples associated with the first component of the block and not on the samples associated with the second components of the block.

Various embodiments and techniques disclosed in the present document can be described in the following listing of examples.

1. A method for video decoding, comprising: receiving a bitstream representation of video data including a block wherein the block comprises samples associated with a first component and second components, wherein samples associated with the first component of the block have a dimension M×N; and decoding the first component and the second components of the block; wherein decoding the first component of the block comprises, based on the dimension, decoding a plurality of sub-blocks for the first component of the block, and the plurality of the sub-blocks are generated by performing a splitting operation only on the samples associated with the first component of the block and not on the samples associated with the second components of the block.

2. The method of example 1, wherein decoding the first component and the second components of the block with Inter mode, Intra mode, or Intra block copy mode.

3. The method of example 1 or 2, when M≤TX and/or N≤TY, TX and TY being integers, decoding the first component of the block of video data comprises decoding the plurality of sub-blocks for the first component of the block.

4. The method of any one of examples 1-3, wherein the first component of the block is a luma component and the second components of the block are chroma components.

5. The method of any one of examples 1-4, wherein TX=TY=8.

6. The method of any one of examples 1-4, wherein TX=TY=4.

7. The method of any one of example 1-6, wherein at least one of a QuadTree (QT) partition structure, a Ternary Tree (TT) partition structure and a Binary Tree (BT) partition structure is employed to perform the splitting operation on the samples associated with the first component of the block to generate the plurality of sub-blocks for the first component.

8. The method of any one of examples 1-6, wherein it is signaled or inferred that the splitting operation is performed on the samples associated with the first component of the block and it is inferred that no splitting operation is performed on the samples associated with the second components of the block without being signaled.

9. The method of example 4, wherein before decoding the chroma components of the block, the plurality of sub-blocks for the luma component are decoded sequentially for the luma component.

10. The method of example 4, wherein after decoding the chroma components of the block, the plurality of sub-blocks for the luma component are decoded sequentially for the luma component.

11. The method of example 4, wherein before decoding the chroma components of the block, one of the plurality of sub-blocks with a minimum index for the luma component is decoded; and after decoding the chroma components of the block, remaining of the plurality of sub-blocks for the luma component are decoded sequentially for the luma component.

12. The method of any one of examples 9-11, wherein the chroma components of the block comprises a Cb component and a Cr component, and the Cb component is decoded before or after the Cr component.

13. The method of example 4, wherein samples associated with the chroma component of the block serve as leaf nodes which cannot be split into smaller coding units (CU) for the chroma component.

14. The method of example 4, wherein samples associated with at least one of the plurality of sub-blocks for luma component serve as leaf nodes which cannot be split into smaller CUs for the luma component.

15. The method of example 4, wherein samples associated with at least one of the plurality of sub-blocks for luma component serve as non-leaf nodes which can be split into smaller CUs for the luma component.

16. The method of any one of examples 13-15, wherein all video data and samples associated with the block are included in a coding unit.

17. The method of example 4, further comprising reconstructing the block of video data by reconstructing the luma component of the block and the chroma components of the block, wherein before reconstructing the chroma components of the block, all of the plurality of sub-blocks for the luma component are reconstructed.

18. A method for encoding video data including a block wherein the block comprises samples associated with a first component and second components, wherein samples associated with the first component of the block have a dimension M×N, the method comprising: encoding the first component and the second components of the block, wherein encoding the first component of the block comprises, based on the dimension, encoding a plurality of sub-blocks for the first component of the block, and the plurality of the sub-blocks are generated by performing a splitting operation only on the samples associated with the first component of the block and not on the samples associated with the second components of the block.

19. The method of example 18, wherein encoding the first component and the second components of the block with Inter mode, Intra mode, or Intra block copy mode.

20. The method of example 18 or 19, further comprising when M≤TX and/or N≤TY, TX and TY being integers, encoding the first component of the block comprises encoding the plurality of sub-blocks for the first component of the block.

21. The method of example 18 or 19, wherein the first component of the block is a luma component and the second components of the block are chroma components.

22. The method of example 21, wherein TX=TY=8.

23. The method of examples 21, wherein TX=TY=4.

24. The method of any one of example 18-23, wherein at least one of a QuadTree (QT) partition structure, a Ternary Tree (TT) partition structure and a Binary Tree (BT) partition structure is employed to perform the splitting operation on the samples associated with the first component of the block to generate the plurality of sub-blocks for the first component.

25. The method of example 21, further comprising: signaling the luma component and the chroma components of the block to a decoding side, wherein signaling the luma component of the block comprises signaling the plurality of sub-blocks for the luma component.

26. The method of example 25, wherein before encoding/signaling the chroma components, the plurality of sub-blocks for luma component are encoded/signaled sequentially for the luma component.

27. The method of example 25, wherein after encoding/signaling the chroma components, the plurality of sub-blocks for luma component are encoded/signaled sequentially for the luma component.

28. The method of example 25, wherein before encoding/signaling the chroma components, one of the plurality of sub-blocks with a minimum index for luma component is encoded/signaled; and after encoding/signaling the chroma components, remaining of the plurality of sub-blocks for luma component are encoded/signaled sequentially for the luma component.

29. The method of any one of example 26-28, wherein the chroma components of the block comprises a Cb component and a Cr component, and the Cb component is encoded/signaled before or after the Cr component.

30. The method of example 21, wherein samples associated with the chroma component of the block serve as leaf nodes which cannot be split into smaller coding units (CU) for the chroma component.

31. The method of example 21, wherein samples associated with at least one of the plurality of sub-blocks for luma component serve as leaf nodes which cannot be split into smaller CUs for the luma component.

32. The method of example 21, wherein samples associated with at least one of the plurality of sub-blocks for luma component serve as non-leaf nodes which can be split into smaller CUs for the luma component.

33. The method of example 21, wherein all video data and samples associated with the block are included in a coding unit.

34. An apparatus in a video system comprising a processor and a non-transitory memory with instructions thereon, wherein the instructions upon execution by the processor, cause the processor to implement the method in any one of examples 1-33.

35. A computer program product stored on a non-transitory computer readable media, the computer program product including program code for carrying out the method in any one of examples 1-33.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:
1. A method of coding video data, comprising:
generating a luma parent coding block from a luma coding tree block (CTB) of a video, based on a first luma partition scheme, wherein first luma partition scheme includes recursive partition operations;
generating a chroma parent coding block from a chroma coding tree block (CTB) based on a first chroma partition scheme, wherein the first chroma partition scheme has same recursive partition operations with the first luma partition scheme;
determining to apply a further partition operation on the luma parent coding block based on a color format of the luma and chroma CTB, a coding mode and a dimension of the parent luma coding block meeting certain con- ditions to generate multiple luma coding blocks and not to apply the further partition operation on the chroma parent coding block; and performing a conversion between the multiple luma coding blocks and a bitstream of the video and a conversion between the chroma parent coding block and the bitstream, wherein the dimension of the parent luma coding block meets the certain conditions in a case that the parent luma coding block has a dimension 8×8, the coding mode of the parent luma coding block is intra mode type and the color format is 4:2:0, and wherein the further partition operation comprises a Quad Tree (QT) partition structure, a Ternary Tree (TT) partition structure or a Binary Tree (BT) partition structure.

2. The method of claim 1, wherein the dimension of the parent luma coding block meets certain conditions in a case that the parent luma coding block has a dimension 4×8 or 8×4 without considering the color format of the luma and chroma CTB and the coding mode of the luma parent coding block.

3. The method of claim 1, wherein in response to applying the further partition operation on the luma parent coding block, the luma parent coding block is partitioned into multiple luma sub-partitions, and wherein the multiple luma sub-partitions are decoded before the chroma parent coding block.

4. The method of claim 1, wherein the chroma parent coding block comprises a Cb block and a Cr block, and the Cb block is decoded before the Cr block.

5. The method of claim 1, wherein the conversion includes decoding the multiple luma coding blocks and the chroma parent coding block from the bitstream.

6. The method of claim 1, wherein the conversion includes encoding the multiple luma coding blocks and the chroma parent coding block into the bitstream.

7. An apparatus for processing video data comprising a processor and a non-transitory memory with instructions thereon, wherein the instructions upon execution by the processor, cause the processor to:

generate a luma parent coding block from a luma coding tree block (CTB) of a video, based on a first luma partition scheme, wherein first luma partition scheme includes recursive partition operations;

generate a chroma parent coding block from a chroma coding tree block (CTB) based on a first chroma partition scheme, wherein the first chroma partition scheme has same recursive partition operations with the first luma partition scheme;

determine to apply a further partition operation on the luma parent coding block based on a color format of the luma and chroma CTB, a coding mode and a dimension of the parent luma coding block meeting certain conditions to generate multiple luma coding blocks and not to apply the further partition operation on the chroma parent coding block; and perform a conversion between the multiple luma coding blocks and a bitstream of the video and a conversion between the chroma parent coding block and the bitstream, wherein the dimension of the parent luma coding block meets the certain conditions in a case that the parent luma coding block has a dimension 8×8, the coding mode of the parent luma coding block is intra mode type and the color format is 4:2:0, and wherein the further partition operation comprises a Quad Tree (QT) partition structure, a Ternary Tree (TT) partition structure or a Binary Tree (BT) partition structure.

8. The apparatus of claim 7, wherein the dimension of the parent luma coding block meets certain conditions in a case that the parent luma coding block has a dimension 4×8 or 8×4 without considering the color format of the luma and chroma CTB and the coding mode of the luma parent coding block.

9. The apparatus of claim 7, wherein in response to applying the further partition operation on the luma parent coding block, the luma parent coding block is partitioned into multiple luma sub-partitions, and wherein the multiple luma sub-partitions are decoded before the chroma parent coding block.

10. The apparatus of claim 7, wherein the chroma parent coding block comprises a Cb block and a Cr block, and the Cb block is decoded before the Cr block.

11. The apparatus of claim 7, wherein the conversion includes decoding the multiple luma coding blocks and the chroma parent coding block from the bitstream.

12. The apparatus of claim 7, wherein the conversion includes encoding the multiple luma coding blocks and the chroma parent coding block into the bitstream.

13. A non-transitory computer-readable storage medium storing instructions that cause a processor to:

generate a luma parent coding block from a luma coding tree block (CTB) of a video, based on a first luma partition scheme, wherein first luma partition scheme includes recursive partition operations;

generate a chroma parent coding block from a chroma coding tree block (CTB) based on a first chroma partition scheme, wherein the first chroma partition scheme has same recursive partition operations with the first luma partition scheme;

determine to apply a further partition operation on the luma parent coding block based on a color format of the luma and chroma CTB, a coding mode and a dimension of the parent luma coding block meeting certain conditions to generate multiple luma coding blocks and not to apply the further partition operation on the chroma parent coding block; and perform a conversion between the multiple luma coding blocks and a bitstream of the video and a conversion between the chroma parent coding block and the bitstream, wherein the dimension of the parent luma coding block meets the certain conditions in a case that the parent luma coding block has a dimension 8×8, the coding mode of the parent luma coding block is intra mode type and the color format is 4:2:0, and wherein the further partition operation comprises a Quad Tree (QT) partition structure, a Ternary Tree (TT) partition structure or a Binary Tree (BT) partition structure.

14. The non-transitory computer-readable storage medium of claim 13, wherein the dimension of the parent luma coding block meets certain conditions in a case that the parent luma coding block has a dimension 4×8 or 8×4 without considering the color format of the luma and chroma CTB and the coding mode of the luma parent coding block.

15. The non-transitory computer-readable storage medium of claim 13, wherein in response to applying the further partition operation on the luma parent coding block, the luma parent coding block is partitioned into multiple luma sub-partitions, and wherein the multiple luma sub-partitions are decoded before the chroma parent coding block.

16. The non-transitory computer-readable storage medium of claim 13, wherein the chroma parent coding block comprises a Cb block and a Cr block, and the Cb block is decoded before the Cr block.

17. A method for storing a bitstream of a video, comprises:

generating a luma parent coding block from a luma coding tree block (CTB) of the video, based on a first luma partition scheme, wherein first luma partition scheme includes recursive partition operations;

generating a chroma parent coding block from a chroma coding tree block (CTB) based on a first chroma partition scheme, wherein the first chroma partition scheme has same recursive partition operations with the first luma partition scheme;

determining to apply a further partition operation on the luma parent coding block based on a color format of the luma and chroma CTB, a coding mode and a dimension of the parent luma coding block meeting certain conditions to generate multiple luma coding blocks and not to apply the further partition operation on the chroma parent coding block;

generating the bitstream based on the determining; and storing the bitstream in a non-transitory computer-readable recording medium, wherein the dimension of the parent luma coding block meets the certain conditions in a case that the parent luma coding block has a dimension 8×8, the coding mode of the parent luma coding block is intra mode type and the color format is 4:2:0, and wherein the further partition operation comprises a Quad Tree (QT) partition structure, a Ternary Tree (TT) partition structure or a Binary Tree (BT) partition structure.

18. The method of claim 17, wherein the dimension of the parent luma coding block meets certain conditions in a case that the parent luma coding block has a dimension 4×8 or 8×4 without considering the color format of the luma and chroma CTB and the coding mode of the luma parent coding block.

19. The method of claim 17, wherein in response to applying the further partition operation on the luma parent coding block, the luma parent coding block is partitioned into multiple luma sub-partitions, and wherein the multiple luma sub-partitions are decoded before the chroma parent coding block.

20. The method of claim 17, wherein the chroma parent coding block comprises a Cb block and a Cr block, and the Cb block is decoded before the Cr block.

* * * * *